United States Patent
Hasegawa et al.

(10) Patent No.: US 6,749,816 B1
(45) Date of Patent: Jun. 15, 2004

(54) HIGH-PRESSURE TREATMENT APPARATUS, FEEDING METHOD THERETO AND PROTECTION METHOD THEREOF

(75) Inventors: Yutaka Hasegawa, deceased, late of Kawasaki (JP), by Tadashi Hasegawa, Hiroko Hasegawa, legal representatives; Kazuya Yamada, Tokyo (JP); Yoshie Akai, Yokohama (JP); Norihisa Saito, Yokohama (JP); Yoshikazu Matsubayashi, Yokosuka (JP); Yasushi Yamaguchi, Kawaguchi (JP); Hisao Oomura, Yokohama (JP); Yumiko Abe, Yokohama (JP); Atsushi Ohara, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/472,150

(22) Filed: Dec. 27, 1999

(30) Foreign Application Priority Data

Dec. 28, 1998 (JP) ............................................. 10-373823

(51) Int. Cl.⁷ ............................... B01J 8/00; B01J 3/02; B01J 3/03; G05D 16/00
(52) U.S. Cl. ...................... 422/189; 422/105; 422/112; 422/232; 422/242; 422/296
(58) Field of Search ................................ 422/189, 105, 422/112, 232, 296, 202, 208, 240–242, 205, 207, 224, 184.1, 292, 295, 299, 109; 588/208, 226, 900

(56) References Cited

U.S. PATENT DOCUMENTS

| | | | |
|---|---|---|---|
| 1,986,196 A | * | 1/1935 | Grosse ......................... 422/241 |
| 4,199,545 A | * | 4/1980 | Matovich ..................... 422/112 |
| 4,338,199 A | | 7/1982 | Modell ........................ 210/721 |
| 5,094,753 A | * | 3/1992 | Allington et al. ............ 210/634 |
| 5,409,617 A | | 4/1995 | Ross et al. ................... 210/762 |
| 5,552,039 A | * | 9/1996 | McBrayer et al. .......... 210/177 |
| 5,591,415 A | * | 1/1997 | Dassel et al. ................ 422/241 |
| 5,620,606 A | * | 4/1997 | McBrayer et al. .......... 210/696 |
| 5,932,182 A | * | 8/1999 | Blaney ......................... 203/16 |

FOREIGN PATENT DOCUMENTS

| | | |
|---|---|---|
| JP | 7-313987 | 12/1995 |
| JP | 8-38853 | 2/1996 |
| JP | 9-85075 | 3/1997 |
| JP | 9-299966 | 11/1997 |

OTHER PUBLICATIONS

JPO English Language Machine Translation, JP 09–085075, Mar. 1997, Akira et al.*

(List continued on next page.)

*Primary Examiner*—Hien Tran
*Assistant Examiner*—Jennifer A. Leung
(74) *Attorney, Agent, or Firm*—Finnegan, Henderson, Farabow, Garrett & Dunner, L.L.P.

(57) ABSTRACT

A high-pressure treatment apparatus comprises a first solid reservoir, a second solid reservoir connected to the first solid reservoir through a first connecting pipe, a high-pressure reactor connected to the second solid reservoir through a second connecting pipe, means for feeding reaction medium into the high-pressure reactor, a first sealing unit and a second sealing unit intervened respectively in the first connecting pipe and second connecting pipe, a first fluid feed unit for feeding a first fluid between the first sealing unit and the second sealing unit, a second fluid feed unit for feeding a second fluid between the second sealing unit and the high-pressure reactor, and means for opening the second sealing unit at the time of shut-off of the first sealing unit and controlling the first fluid and the second fluid to form a pressure-gradient so that pressure between the first sealing unit and the second sealing unit and pressure between the second sealing unit and the high-pressure reactor decrease gradually toward the high-pressure reactor.

11 Claims, 18 Drawing Sheets

OTHER PUBLICATIONS

"Measurement and control of flow rate of powder," Chemical Engineering (Jul. 1998), 62:379–380.

Caruana, "Supercritical Water Oxidation Aims for Wastewater Cleanup," Chemical Engineering Progress (Apr. 1995), pp. 10–18.

Hazlebeck et al., "Design of Corrosion Resistant HTO Systems for DOD Hazardous Wastes," General Atomics Project (Jan. 1995).

Adschiri et al., "Noncatalytic Conversion of Cellulose in Supercritical and Subcritical Water," Journal of Chemical Engineering of Japan (1993), 26:676–680.

Erickson et al., "Effect of Pressure on an Enzymatic Reaction in a Supercritical Fluid," AIChE Journal (Feb. 1990), 36:299–301.

Kagakukogaku Kyokai, Kagakukougaku Binran (Rev. $5^{th}$ Ed.) (1988), pp. 870–871.

Jezko et al., "The Effect of Solvent Properties on the Supercritical Gas Extraction Of Coal," Fuel Processing Technology (1982), 5:229–239.

Stern et al., "The Corrosion Behavior Of Titanium–Palladium Alloy," Trans. Amer. Soc. Metals (1960), 52:239–256.

Metallic Pipe Systems: Carbon Steel and Stainless Steel, Perry's Chemical Engineers' Handbook, $6^{th}$ Ed., 6–61.

Cement, Lime, and Gypsum, Perry's Chemical Engineers' Handbook, $6^{th}$ Ed., 8–53.

"Measurement and control of flow rate of powder," Chemical Engineering (1998) 62:379–80 (translation).

"Kagakukogaku Kyokai,"Kagakukougaku Binrani, Rev. 5th Ed. (1988) 870–71 (translation).

"Metallic Pipe Systems: Carbon Steel and Stainless Steel," Perry's Chemical Engineers' Handbook 6–61 ($6^{th}$ ed. 1984).

* cited by examiner

HIGH-PRESSURE TREATMENT APPARATUS, FEEDING METHOD THERETO AND PROTECTION METHOD THEREOF

BACKGROUND OF THE INVENTION

1. Field of the Invention

The present invention relates to a high-pressure treatment apparatus for reacting and treating an object to be treated such as organic radioactive waste such as, for instance, ion exchange resin used at atomic power plants with a medium such as, for instance, water, oxygen or the like under high-pressure. To be more specific, the present invention relates to a high-pressure treatment apparatus using a medium in a sub-critical or super-critical state. In particular, the present invention relates to, in the aforementioned apparatus, a high-pressure reactor for reacting therein an object to be treated and a medium under a high-pressure, a feeder for feeding the object to the high-pressure reactor and a feeding method thereof, and a method for protecting the high-pressure reactor.

2. Description of the Related Art

In recent years, a technology for reacting in water under high pressure and high temperature exceeding the critical point of water (temperature: 374° C., pressure: 22 MPa), a technology for reacting in carbon dioxide under high pressure and high temperature exceeding the critical point of carbon dioxide (temperature: 31° C., pressure: 7.38 MPa) and a technology for reacting in hydrocarbons under high-pressures exceeding critical points of various kinds of hydrocarbons are well known. By making use of such super-critical fluids, the following effects can be obtained (for instance, Caruana, C. M.: Chem. Eng. Prog., 4, 10 (1995), Erickson, J. C., P. Schyns, and C. L. Cooney: AlChE J., 36, 299 (1990), and Jezko, J., D. Gray, and J. R. Kershaw: Fuel Processing Technology, 5, 229–239 (1982)).

(1) With only a small pressure change, a large density change can be obtained. In general, solubility of substance varies in proportion to the density thereof. Accordingly, a large difference of solubility can be obtained by changing pressure only. This property can be applied in extraction and separation.

(2) Super-critical fluid, though the density thereof is similar to that of liquid, is low in viscosity thereof and high in diffusion thereof. Accordingly, the super-critical fluid is more advantageous than liquid from a viewpoint of mass transfer, resulting in a large rate of reaction.

(3) Thermal conduction of super-critical fluid is remarkably high. Accordingly, reaction temperatures can be controlled with ease.

Recently, an apparatus of decomposing organic waste and inorganic waste by use of such sub-critical fluid or super-critical fluid, in particular, super-critical water as a reaction medium is attracting attention. According to this method, in spite of relatively high cost thereof, compared with the case of incinerating, there are advantages that reaction products can be completely decomposed to non-hazardous substances and incineration ashes are prevented from dispersing. Accordingly, this method is considered to apply in decomposition of hazardous organic materials and radioactive wastes.

When processing such substances, safety of an apparatus is the most important problem. It is presumed that high-pressure reactors are not subjected to damage such as corrosion. In addition, the treatment object, in feeding to the apparatus, is required to prevent from leaking outside of the apparatus.

A high-pressure reactor, generally considering corrosion-resistance to reaction media and reaction products, is designed as a pressure vessel having thickness of strength capable of enduring the pressure thereof. Austenite system stainless steel and Ni based alloy that have high-temperature strength and are corrosion-resistant are used in large as typical materials for high-temperature and high-pressure reactors. However, under such an oxidizing condition that the super-critical water contains $Cl^-$ or $SO_4^{2-}$, it is reported that these are not sufficiently corrosion-resistant and tend to be subjected to corrosion (for instance, D. A. Hazlebeck, K. W. Doeney, J. P. Elliot and M. H. Spritzer, Proc. First Int. Workshop on Super-critical Water oxidation).

As highly corrosion-resistant metallic materials in such an environment, noble metals such as Pt, Au or the like, Ti, Ti alloys, Ta, Ta alloys or ceramics can be considered. However, these materials are expensive compared with generally used steel for pressure-vessel. In addition, some of these are highly corrosion-resistant but too low in strength to be a pressure-vessel by itself. In such cases, they can be used only as covering materials for such as lining and coating.

As a means to these ends, a structure is disclosed in which a high-pressure vessel is built into a double-vessel structure, inside of an exterior pressure vessel a high-pressure vessel as a high pressure reactor is installed, and the pressure within the high-pressure vessel and that of the gap portion therebetween is made equal to be balanced. Thereby, the high-pressure vessel is alleviated from being pressurized too much (for instance, WPI Acc No. 98-057323/199806: Supercritical water oxidation processing (ORGANO CORP)).

In this method, the high-pressure vessel is not required to be highly pressure-resistant but is required only to be corrosion-resistant. Accordingly, a vessel of thin-walled structure can be adopted. As a result of this, the cost of a vessel can be reduced. In addition, the exterior pressure vessel is not required to be highly corrosion-resistant but required only to be pressure-resistant. Accordingly, various kinds of materials can be adopted to result in cost reduction.

However, it is difficult to foresee completely local damages such as pitting and stress-corrosion cracking. Once such a damage happened, hazardous materials within the high-pressure vessel diffuse into the gap to be likely to contaminate even the exterior pressure vessel.

When it is necessary to heat the high-pressure vessel due to insufficient generation of heat of reaction, ordinarily a heating unit such a heater or the like is arranged outside of the high-pressure vessel. Therewith, the inside of the vessel is heated by making use of the vessel wall as heat conduction medium. However, when there is likelihood of contaminating even the exterior pressure vessel as mentioned above, though the heating unit is necessary to be arranged outside of the exterior pressure vessel, due to existence of pressure-holding medium between the exterior pressure vessel and the high-pressure vessel, heating efficiency becomes extremely low.

In order to make a treatment object react efficiently, it is desirable that feeding amount and feeding speed of the object to the high-pressure vessel can be controlled with ease. From a viewpoint of safety too, such a control is necessary. However, when the treatment objects are solid materials, it is difficult to feed them into the high-pressure reactor of high temperature and high pressure. In particular, it is difficult to feed them continuously.

Within super-critical fluids or sub-critical fluids, reactions of substance proceed faster. Accordingly, if super-critical fluid or sub-critical fluid within the high-pressure vessel penetrates into feeding system in the treatment apparatus, it is likely for the reaction to occur inside of the feeding system.

Such a problem is common not only in the case of feeding solid materials into super-critical fluid but also in the case of feeding into highly pressurized fluid.

Accordingly, it is of great importance to prevent the fluid within a high-pressure vessel from the back flow into a feeding system of an object to be treated.

In FIGS. 17 and 18, conventional feeding systems of feeding solid materials into a high-pressure vessel are shown.

FIG. 17 shows an example of system diagrams, where organic material prepared in slurry are fed into a high-pressure reactor by use of a feed-pump (see U.S. Pat. No. 4,338,199: Processing Method for the Oxidation of Organics in Supercritical Water).

Organic materials fed into a feed slurry tank 11 are mixed with water for adjusting to form slurry. This slurry is fed by use of a feed-pump 15 into an oxidizing reactor 19 through an extractor 17 and is mixed with air or oxygen fed from a raw material source 20 through an oxidant compressor 22 to react under a super-critical state. Reaction products are sent to an ash separator 25 and, after removal of ashes 26, are sent to an expander turbine 28 to proceed to an outlet 30.

Like this technology, in order to feed the solid materials in slurry form to a high-pressure reactor, the solid materials are necessary to be pulverized into powder of a representative diameter of several tens $\mu$m or less to mix with fluid. However, fine powder, being likely to be dispersed and to be easily influenced by static electricity, is difficult to handle. In addition, for instance, in the case of plastics, because of hydrophobic property and large difference of density with water, there may be cases where preparation in slurry form is difficult. Further, when a treatment object is ion-exchange resin to which radioactive nuclides were absorbed, pulverizing as pretreatment is equivalent to dispersing contamination. Consequently, it can not be prepared in slurry form.

FIG. 18 shows a conventional example of which melting plastic waste is fed (see Adschiri, T., S. Hirose, and K. Arai: J. Chem. Eng. Japan, 26,676 (1993).

Plastic waste 51, after being melted in a melting bath 52 to which a heat-exchange pipe 54 is installed to form molten plastic 53, is fed to a pre-heater 55. Then, the molten plastic 53 fed to a reactor 56 is mixed with water vapor 58 of high temperature fed from a boiler 57 to be decomposed in a super-critical state. Generated reaction products 59, after cooled by the pre-heater 55, go through a heat exchange pipe 54 of the melting bath 52 to utilize for melting the plastic waste 51. Further, as demand arises, the reaction products are cooled at the heat exchanger 60, followed by sending to a gas-liquid separator 61. Liquid component is sent to a separator 62 and gaseous component is sent to after-processing unit 66.

This technology can only handle solids that can be melted but can not handle coal or thermosetting plastics. This is a problem of the conventional technology.

SUMMARY OF THE INVENTION

The present invention is carried out to solve the aforementioned problems that the conventional technology has. A first object of the present invention, so as to process safely and efficiently under a highly corrosive condition of high pressure and high temperature, is to provide a high-pressure treatment apparatus that is excellent in safety and corrosion-resistance and is less expensive.

A second object of the present invention is to provide a method for protecting a high-pressure treatment apparatus having a high-pressure reactor excellent in safety and corrosion-resistance and the high-pressure reactor thereof.

A third object of the present invention is to provide a high-pressure treatment apparatus in which solid, without preparing in slurry form or without melting, is fed intermittently or continuously into a high-pressure reactor, and a method of feeding the treatment object. Further, a fourth object of the present invention is to provide a high-pressure treatment apparatus that, in feeding the treatment object, can certainly prevent the fluid within the high-pressure reactor from flowing backwards toward the feeder, and a feeding method of the treatment object.

In order to accomplish the aforementioned objects, a first high-pressure treatment apparatus of the present invention comprises a first solid reservoir, a second solid reservoir connected to the aforementioned first solid reservoir through a first connecting pipe, a high-pressure, reactor connected to the second solid reservoir through a second connecting pipe, means for feeding reaction medium into the high-pressure reactor, first and second sealing units that are intervened respectively in the first connecting pipe and the second connecting pipe, a first fluid feed unit for feeding a first fluid between the first sealing unit and the second sealing unit, a second fluid feed unit for feeding a second fluid between the second sealing unit and the high-pressure reactor, and means for opening the second sealing unit at the time of shut-off of the first sealing unit and controlling the first and second fluids to form a pressure gradient so that pressure between the first sealing unit and the second sealing unit and pressure between the second sealing unit and the high-pressure reactor decrease gradually towards the high-pressure reactor.

For the first sealing unit and the second sealing unit, for instance, reciprocating switchgears can be used, but without restricting to this, any units that can secure sealing of high-pressure fluid can be used.

As the treatment object, solids that are difficult in preparing in slurry form or difficult in melting can be a treatment objects. For instance, hydrophobic plastic waste, solid wastes that absorb radioactive nuclides, and coal can be cited.

As reactions occurring within a high-pressure reactor, decomposition, oxidation, synthesis, and extraction/separation of substances due to super-critical state or sub-critical state can be cited. However, the reactions are not necessarily restricted to the reactions in the super-critical state or the sub-critical state but can be any reactions under high pressures.

For the reaction media, water, carbon dioxide, hydrocarbons, air, oxygen, or mixtures of two kinds or more thereof can be preferably used. The reaction media is not restricted to these and any one can be selected according to the aimed reactions, treatment objects or the like.

An oxidant can be added to a reaction medium. For instance, in case of decomposition of plastic, an addition of an aqueous solution of hydrogen peroxide as an oxidant to water improves preferably decomposition efficiency.

The first and the second fluids can be appropriately selected according to aimed reactions, the objects being processed or the like. For instance, gases such as air, oxygen gas, carbon dioxide gas, hydrocarbon gases, nitrogen gas, argon gas or mixtures of two kinds or more thereof can be used. In addition, liquids such as water, aqueous solution of hydrogen peroxide, liquid hydrocarbons, or mixtures of two kinds or more thereof can be used.

For instance, in decomposing plastics or burning coal, when air or oxygen is used as the first and the second fluids, reaction efficiency in the high-pressure reactor can be preferably improved. Air can be obtained with ease and an apparatus can be simplified. Accordingly, it is also preferable from a viewpoint of cost.

When the liquid such as water is used, the treatment object can be preferably fed into the high-pressure reactor while washing out the treatment object.

With such a constitution, in feeding a treatment object that is solid into a high-pressure reactor, the fluid can be prevented from back flow from the high-pressure reactor to the second solid reservoir.

The high-pressure treatment apparatus of the present invention, in the first high-pressure treatment apparatus, is characterized in that means for forming the pressure gradient comprises a first pressure adjustment unit for adjusting the pressure of the first fluid, a first flow rate adjustment unit for adjusting a feed amount of the first fluid, a second pressure adjustment unit for adjusting the pressure of the second fluid, and a second flow rate adjustment unit for adjusting a feed amount of the second fluid.

With such a constitution, in feeding a treatment object that is solid into a high-pressure reactor, by causing the fluid to flow always from the second solid reservoir to the high-pressure reactor, the fluid can be firmly prevented from back flow from the high-pressure reactor to the second solid reservoir.

The high-pressure treatment apparatus of the present invention, in the first high-pressure treatment apparatus, is characterized in that a volume of the second solid reservoir is smaller than that of the first reservoir.

The volume ratio of the first solid reservoir and the second solid reservoir is in the range of from 100000 to 2:1, preferably in the range of from 10000 to 10:1, more preferably in the range of from 100 to 10:1. When solid is fed into the high-pressure reactor, though different according to materials for apparatus, temperatures to be used, pressures to be used and so on, a material thickness of the apparatus required to be pressure-resistant is necessary to be made thick. The first solid reservoir is not required to be pressure-resistant. Accordingly, if constituted so that the treatment object is divided in small volumes to transfer from the first solid reservoir to the second solid reservoir of smaller volume, the second solid reservoir required to be pressure-resistant can be made smaller than the existing one, resulting in reduction of apparatus cost.

The high-pressure treatment apparatus of the present invention, in the first high-pressure treatment apparatus, is characterized in that the second solid reservoir comprises a pressure relief valve.

By opening this pressure relief valve, the treatment object can be transferred from the first solid reservoir to the second solid reservoir under atmospheric pressure.

The high-pressure treatment apparatus of the present invention, in the first high-pressure treatment apparatus, is characterized in that the first connecting pipe, the second solid reservoir, the second connecting pipe, the second sealing unit and the high-pressure reactor all of that are installed downstream from the first sealing unit are pressure-resistant.

As mentioned above, in feeding solid into the high-pressure reactor, the apparatus necessary to be pressure-resistant is necessary to be made thick in its wall thickness. If the range, which is required to be pressure-resistance, can be made smaller than the existing one, the cost of an apparatus can be reduced.

The high-pressure treatment apparatus of the present invention, in the first high-pressure treatment apparatus, is characterized in that transfer of the solid from the second solid reservoir to the high-pressure reactor is carried out by gravity.

With such a constitution, the structure for feeding the treatment object from the second reservoir to the high-pressure reactor can be simplified.

The high-pressure treatment apparatus of the present invention, in the first high-pressure treatment apparatus, is characterized in that at least one of the first solid reservoir and the second solid reservoir is provided with a vibrating means.

In feeding the solid in the first solid reservoir or the second reservoir, vibration prevents the solid from bridging therebetween. Thereby, the first solid reservoir or the second solid reservoir or the connecting pipe can be prevented from being clogged by the solid.

The high-pressure treatment apparatus of the present invention, in the first high-pressure treatment apparatus, is characterized in that cooling means is installed between the second sealing unit and the high-pressure reactor.

With such a constitution, even if the temperature of the high-pressure reactor side is high, the temperature of the second sealing unit side can be held low.

The high-pressure treatment apparatus of the present invention, in the first high-pressure treatment apparatus, is characterized in that a ball valve is used at least in one of the first sealing unit and the second sealing unit.

Here, the ball valve is a valve that is a spherical valve body, has a pass area identical with piping, and can dispense with grease (see Perry's Chemical Engineers' Handbook, Sixth Edition 6 to 61).

With such a constitution, a wide pass area of the treatment object and sealing of the high-pressure fluid can be secured. The sealing unit can be made smaller and the driving force counteracting the pressure of the high-pressure reactor is made unnecessary.

The high-pressure treatment apparatus of the present invention, in the first high-pressure treatment apparatus, is characterized in that at least one of between the first solid reservoir and the second solid reservoir and between the second solid reservoir and the high-pressure reactor is provided with a rotary feeder.

Here, the rotary feeder is one kind of powder-feeder and controls feed speed by feeding powder continuously due to rotation of rotary-vane (Edited by Kagakukogaku Kyokai, [Kagakukougaku Binran Revised 5th Edition] 871 (1988), Maruzen Publishing Co).

By installing the rotary feeder, the treatment object in the second solid reservoir can be continuously and quantitatively fed to the high-pressure reactor.

The high-pressure treatment apparatus of the present invention, in the first high-pressure treatment apparatus, is characterized in that a primary crushing means for implementing primary crushing of the solid being fed to the first solid reservoir is provided with.

As the primary crushing means, for instance, an impact crusher is preferably used. However, the primary crusher is not restricted to this and can be appropriately selected according to the treatment objects. The treatment object that has elasticity, when being low-temperature brittleness, can be crushed after lowering the temperature by use of liquid nitrogen or the like.

With such a constitution, even bulky solids can be fed to the high-pressure treatment apparatus. In addition, with a low-temperature crusher, even bulky solids having elasticity, if being substances of low-temperature brittleness, can be fed.

The high-pressure treatment apparatus of the present invention, in the first high-pressure treatment apparatus, is characterized in that between the first solid reservoir and the high-pressure reactor, measuring means for measuring the feed speed of the solid is installed.

For the measuring means, a feed speed measuring unit consisting of a detecting plate and an impact load measuring unit and a feed speed measuring unit consisting of a metering tank and a weighting level gauge can be cited.

With such a constitution, the feed amount of the treatment object can be controlled with ease to result in suppression of fluctuation of conditions such as temperature, pressure and composition inside of the high-pressure reactor. In addition, from the accumulated feed amount, the amount of remaining treatment object in the first solid reservoir or the second solid reservoir can be detected to result in an accurate detection of switching time of the operation mode of the unit.

The high-pressure treatment apparatus of the present invention, in the first high-pressure treatment apparatus, is characterized in that between the second solid reservoir and the high-pressure reactor, a screw feeder is installed.

Here, the screw feeder is an apparatus transferring continuously the crushed solid by use of rotation of a screw. By employing this, the treatment object can be smoothly and continuously fed to the high-pressure reactor.

The high-pressure treatment apparatus of the present invention, in the first high-pressure treatment apparatus, is characterized in that between the second solid reservoir and the high-pressure reactor, a vibration feeder is installed.

Here, the vibration feeder is an apparatus transferring continuously the primarily crushed solid due to vibration in an oblique direction of the vibrator. Thereby, the treatment object can be smoothly and continuously fed to the high-pressure reactor.

A second high-pressure treatment apparatus of the present invention is characterized in that it comprises a high-pressure reactor, an exterior vessel in which the high-pressure reactor is installed, object feed means for feeding a treatment object into the high-pressure reactor, reaction medium feed means for feeding a reaction medium into the high-pressure reactor, and gap pressure control means for controlling the pressure of a gap between the exterior vessel and the high-pressure reactor to be higher than that within the high-pressure reactor.

For the treatment object, not only the solid but also liquid can be used. The solid can be used in the form of slurry or melt after melting. When the treatment object is liquid, for instance, a pump or the like can be used as means for feeding.

By reducing the pressure difference of the inside and the outside of a high-pressure reactor, the strength demanded for the high-pressure reactor can be remarkably reduced. Accordingly, the high-pressure reactor is not required to be high in high-temperature strength and can have a thinner wall thickness. The pressure difference between the inside and the outside of the high-pressure reactor is preferable to be approximately 2 MPa or less, more preferable to be approximately 0.5 MPa or less.

The high-pressure treatment apparatus of the present invention, in the second high-pressure treatment apparatus, is characterized in that the gap pressure control means comprises a feeder of pressure holding fluid for feeding pressure holding fluid into the gap and a pressure controller of the pressure holding fluid for controlling the pressure of the pressure holding fluid.

With such a constitution, the gap pressure can be controlled with ease. Pressure sensors are installed to measure pressures of the inside of the high-pressure reactor and the inside of the gap to control the pressure of the pressure holding fluid based on the measured values of these sensors.

The high-pressure treatment apparatus of the present invention, in the second high-pressure treatment apparatus, is characterized in that means for controlling the temperature of the exterior vessel to be lower than that of the high-pressure reactor is installed.

For instance, by using liquid as the fluid within the gap, the temperature of this liquid is controlled. Thereby, the temperature of the exterior vessel can be made lower than that of the high-pressure reactor. This is particularly preferable when the temperature inside of the high-pressure reactor is high. Temperature sensors for measuring the temperatures of the inside of the high-pressure reactor and the inside of the gap are installed to adjust the temperature of the pressure holding fluid based on the values measured by these sensors.

With such a constitution, the temperature of the exterior vessel can be kept low enough to enable to use materials low in high-temperature strength and corrosion-resistance thereof for the exterior vessel. In addition, the inner wall temperature of the high-pressure reactor can be kept lower than the reaction temperature inside of the reactor to result in lowering corrosion speed of the high-pressure reactor.

The high-pressure treatment apparatus of the present invention, in the second high-pressure treatment apparatus, is characterized in that the exterior vessel is consisting of a trunk and a cover that can be opened and shut, and the high-pressure reactor is fixed to be removable to the exterior vessel.

With such a constitution, the high-pressure reactor can be replaced or repaired with ease.

The high-pressure treatment apparatus of the present invention, in the second high-pressure treatment apparatus, is characterized in that the high-pressure reactor is composed of, or the inner surface of the high-pressure reactor is lined with, one of austenite stainless steel, Ni, Zr, Ti, Ta, Au, Pt, alloys of two kinds or more thereof, and alloys of at least one kind thereof and other metals.

Depending on whether corrosion environment is oxidizing or contains chlorides, various kinds of passive materials can be used considering therange shown in FIG. 16 (M. Stern and C. Bishop, Trans. Amer. Soc. Metals, Vol. 52, p239 (1960)).

For instance, when the high-pressure reactor contains chlorides of low concentration of 100 ppb or less and the environment of which is oxidizing, austenite stainless steel is preferably used to manufacture or to line the high-pressure reactor.

For instance, when the concentration of chlorides is low such as 1% or less, Ni based corrosion resistant alloys can be preferably used to manufacture or line the high-pressure reactor.

For instance, when the concentration of chlorides is low such as 1% or less and the environment is oxidizing, Zr or Zr based alloys can be preferably used to manufacture or line the high-pressure reactor.

For instance, when the concentration of chlorides is slightly higher such as 1% or more and the environment is oxidizing, Ti or Ti based alloys can be preferably used to manufacture or line the high-pressure reactor.

For instance, when the concentration of chlorides is slightly higher such as 1% or more and the environment is oxidizing or reducing, Ta or Ta based alloys can be preferably used to manufacture or line the high-pressure reactor.

When the concentration of chlorides is high such as several % or more, Au, Au based alloys, Pt or Pt based alloys can be preferably used to manufacture or line the high-pressure reactor.

The inner surface of the high-pressure reactor that contacts with highly corrosive reactants, according to the processing environment, can be composed of metals of high corrosion-resistance to protect from corrosion.

The high-pressure treatment apparatus of the present invention, in the second high-pressure treatment apparatus, is characterized in that on the inner surface of the high-pressure reactor, ceramic material is thermally sprayed.

When the temperature inside of the high-pressure reactor is extremely high such as approximately 550° C. or more, ceramics of excellent corrosion-resistance can be preferably thermally sprayed. The inner surface of the high-pressure reactor that contacts with highly corrosive reactants, according to the processing environment, can be coated by the ceramics of high corrosion-resistance to protect from corrosion.

The high-pressure treatment apparatus of the present invention, in the first high-pressure treatment apparatus, is characterized in that the high-pressure reactor is installed inside of the exterior vessel, and gap pressure control means for controlling the pressure inside of the gap of the high-pressure reactor and the exterior vessel to be higher than that inside of the high-pressure reactor.

With such a means, the treatment object, even when being solid, can be fed safely to the high-pressure reactor.

The high-pressure treatment apparatus of the present invention, in the first and second high-pressure treatment apparatuses, is characterized in that the reaction medium within the high-pressure reactor is in super-critical state or sub-critical state.

A method for feeding to a high-pressure treatment apparatus of the present invention, in feeding the solid from a first solid reservoir to a second solid reservoir under atmospheric pressure and in feeding the solid from the second solid reservoir to a high-pressure reactor, is characterized in that between the first solid reservoir and the second solid reservoir a first sealing unit is intervened, between the second solid reservoir and the high-pressure reactor a second sealing unit is intervened, the first sealing unit is shut and the second sealing unit is opened, and the pressure between the first sealing unit and the second sealing unit and the pressure between the second sealing unit and the high-pressure reactor decrease gradually toward the high-pressure reactor to form a pressure gradient.

With such a method, in feeding a treatment object into a high-pressure reactor, fluid can be prevented from back flow from a high-pressure reactor to a second solid reservoir.

A method of protecting a high-pressure reactor of the present invention is characterized in that in the gap between a high-pressure reactor and an exterior vessel inside of which the high-pressure reactor is installed a pressure holding fluid is filled, the pressure holding fluid is pressurized so that the pressure within the gap is maintained higher than that inside of the high-pressure reactor, and the temperature and movement of the pressure holding fluid are controlled so that the temperature of the exterior vessel is maintained lower than that of the high-pressure reactor.

Thus, a high-pressure reactor can be firmly protected.

DESCRIPTION OF THE PREFERRED EMBODIMENTS

Embodiments of the present invention will be explained with reference to the drawings. In the following drawings, the same numbers are given to the same elements to avoid duplicity of explanation.

Embodiment 1

Figure 1:
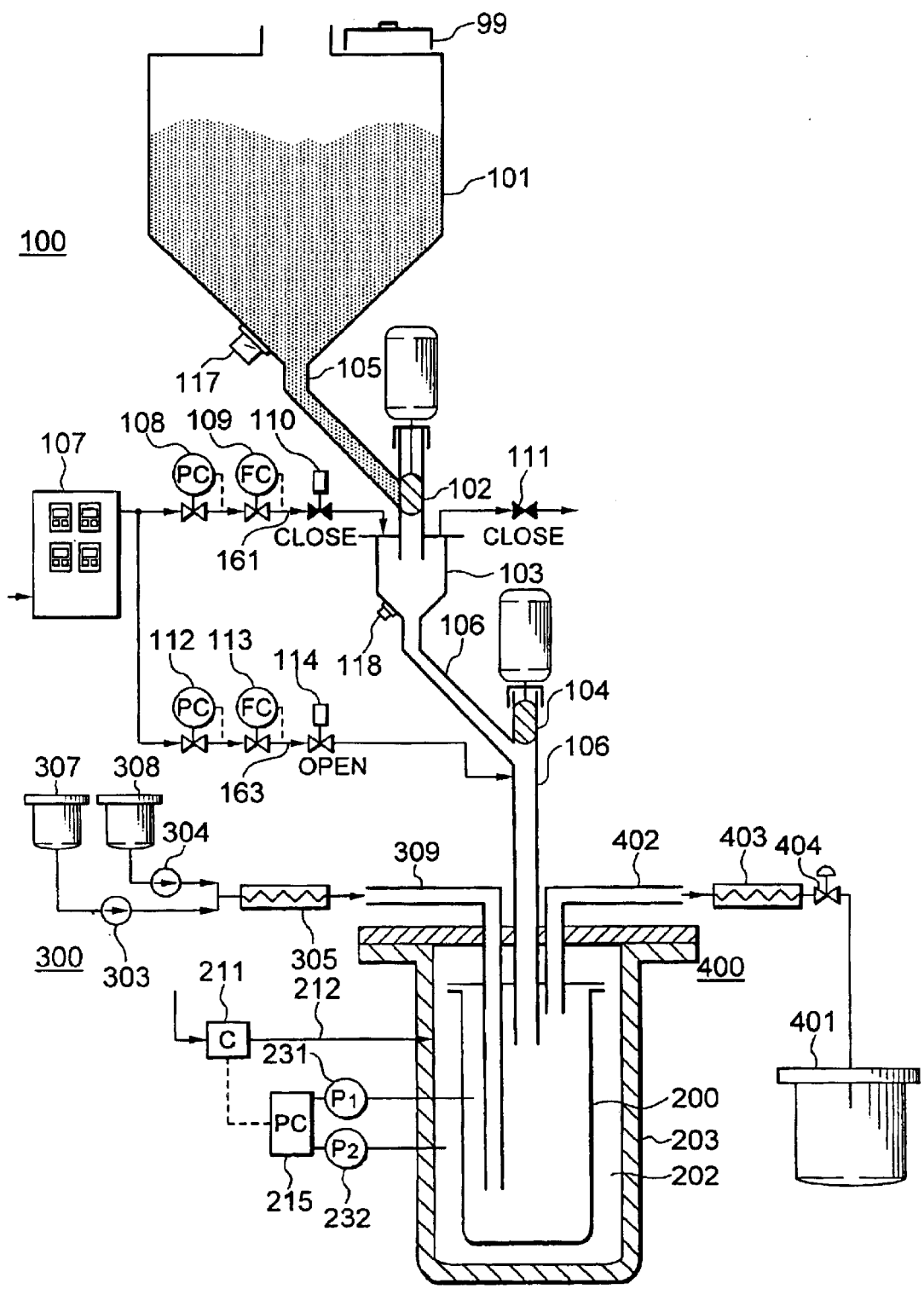
FIG. 1 is a schematic diagram showing diagrammatically a high-pressure treatment apparatus of embodiment 1 of the present invention.

In FIG. 1, a high-pressure treatment apparatus involving the present embodiment is shown.

A high-pressure treatment apparatus of embodiment 1 is an apparatus for decomposing solid waste under super-critical state. Roughly speaking, the high-pressure treatment apparatus comprises a high-pressure reactor 200 for reacting a treatment object under a super-critical state, a feeding system 100 of the treatment object for feeding the treatment object to the high-pressure reactor 200, a medium feeder 300 for feeding a reaction medium to the high-pressure reactor, and a product recovering unit 400 for recovering reaction products generated at the high-pressure reactor 200.

As shown in FIG. 1, in a feeding system 100, to a first feed pipe 105 made of stainless steel connecting a first solid reservoir 101 made of stainless steel and a second solid reservoir 103 made of stainless steel, a first reciprocating switchgear 102 is installed as a first sealing unit. In addition to this, to a second feed pipe 106 made of stainless steel connecting a second solid reservoir 103 and a high-pressure reactor 200, a second reciprocating switchgear 104 is installed as a second sealing unit.

The first solid reservoir 101 is provided with a cover 99 absent of sealing function. When radioactive waste or the like is processed, to prevent leakage to a surrounding circumstance from occurring in feeding the treatment object into the first solid reservoir 101, the feeding system 100 is desirable to be installed in a glove box or a draft.

The first solid reservoir 101 and the second solid reservoir 103 are provided with vibrators 117 and 118, respectively. The volume of the second solid reservoir 103 is designed to be smaller than that of the first solid reservoir 101. For instance, when the volume of the first solid reservoir 101 is 0.1 m$^3$ or more, the volume of the second solid reservoir 103 is preferable to be approximately 0.001 m$^3$ to 0.01 m$^3$. These volumes are not restricted to the above values and can be appropriately set according to the kind, processing amount, processing speed of the treatment object, and the kind of the aimed reaction.

A high-pressure fluid feeder 107 is installed to feed high-pressure fluid to the second solid reservoir 103 and the second feed pipe 106 between the second reciprocating switchgear 104 and the high-pressure reactor 200.

Along a duct of fluid 161 that is fed from the high-pressure fluid feeder 107 to the second solid reservoir 103, a first pressure control unit 108 for controlling the supply pressure of the fluid 161, a first flow control unit 109 for controlling feed flow rate and a first switching valve 110 for starting or stopping to feed are installed.

To the second solid reservoir 103, a pressure relief valve 111 for relieving pressure inside of the second solid reservoir 103 is installed.

Along a duct of fluid 163 fed from the high-pressure fluid feeder 107 to the second feed pipe 106 between the second reciprocating switchgear 104 and the high-pressure reactor 200, a second pressure control unit 112 for controlling the supply pressure of the fluid 163, a second flow control unit 113 for controlling feed flow rate and a second switching valve 114 for starting or stopping to feed are installed.

As to the structure of the object feeding system 100 from the first reciprocating switchgear 102 to the high-pressure reactor 200, walls of the respective structures are made thick to be pressure-resistant. For instance, in this embodiment, when an inner diameter of the feed pipe of stainless steel is approximately 50 mm, the wall-thickness thereof is approximately 50 mm.

The high-pressure reactor 200 is installed inside of an exterior vessel 203 of pressure-resistance. The exterior vessel 203 is made of thick stainless steel to be a pressure-resistant structure. The high-pressure reactor 200 is made of Ti alloy and, different from the exterior vessel 203, is not pressure-resistant structure.

The favorable value of the volume of the high-pressure reactor 200, varying due to the kind of the object, processing amount, processing speed, the kind of decomposition reaction and so on, is appropriately set. In this embodiment, that is set at approximately 0.03 m$^3$.

To the high-pressure reactor 200, a reaction medium feeder 300 is connected. The reaction medium feeder 300 comprises a water tank 307, a hydrogen peroxide water tank 308, pumps 303 and 304 installed thereto respectively, and a reaction medium feed pipe 309 thereto a pre-heater 305 is installed. In order to feed water and hydrogen peroxide in a prescribed ratio to the high-pressure reactor 200, a feed controller can be installed.

To the gap 202 of the high-pressure reactor 200 and the exterior vessel 203 piping 212 is connected to fill water. In addition, pressure sensors 231 and 232 for measuring the pressures inside of the high-pressure reactor 200 and the gap 202 are installed respectively insides of the high-pressure reactor 200 and gap 202. A pressure controller 215 for controlling the pressure of the water based on these measured values is installed outside thereof.

The reaction product recovering unit 400 for recovering reaction products in the high-pressure reactor 200 comprises a reaction product tank 401, a product exhaust pipe 402 connecting the reaction product tank 401 and the high-pressure reactor 200, and a cooling unit 403 and a pressure hold valve 404 installed to the product exhaust pipe 402.

In the present embodiment, coarse powder obtained by crushing plastic waste including polyvinyl chloride to approximately 5 mm or less is used as the solid waste that is a treatment object. The maximum dimension of the plastic waste is desirable, so as to be able to pass the feed pipes 105 and 106 without clogging, to be approximately ¹⁄₁₀ or less of an inner diameter of the feed pipes 105 and 106. However, not being used in the form of slurry, it is not necessary to be crushed to fine powder of several tens μm or less.

For the high-pressure fluids 161 and 163 fed from the high-pressure fluid feeder 107, air is used. Air can be obtained with ease and contains oxygen effective for oxidizing the plastic waste that is the treatment object. Without restricting to the air, according to the kind of the object, air, oxygen gas, carbon dioxide gas, hydrocarbon gas, nitrogen gas, argon gas, or mixtures thereof can be appropriately used.

Further, the high-pressure fluids 161 and 163 are not restricted to gas for instance, water, hydrogen peroxide, liquid hydrocarbons or mixtures of two kinds or more thereof may be used. When such liquids are used as the high-pressure fluids 161 and 163, the aforementioned liquids can be preferably fed to the high-pressure reactor 200 while washing the solid waste off.

For the reaction medium being fed to the high-pressure reactor 200, water is used. For an oxidant, an aqueous solution of hydrogen peroxide is used. The reason why to use the oxidant is to oxidize the plastic waste. The reaction medium is not restricted to water and an appropriate medium can be used according to the aimed reaction or the object.

In the present embodiment, for the pressure hold fluid to be filled in the gap 202 of the high-pressure reactor 200 and the exterior vessel 203, water is used. However, the pressure hold fluid is not particularly restricted to water and any one that can appropriately maintain the pressure and temperature of the gap 202 can be used. Further, when the reaction temperature inside of the high-pressure reactor 200 is not high, the exterior vessel 203 is not required to be kept at lower temperatures than that of the inside of the high-pressure reactor 200. Accordingly, gases such as air, inert gases or the like can be used.

In the present embodiment, a high-pressure reactor 200 made of Ti alloy is used. However, a high-pressure reactor 200 made of stainless steel can be lined the inside thereof with, for instance, Ti alloy. This is preferable from a viewpoint of reduction of material cost. Further, without restricting particularly to Ti alloys, according to the processing conditions such as pressure, temperature and chloride concentration and the objects being processed, materials of the high-pressure reactor 200 or lining materials thereof can be appropriately selected.

Figure 16:
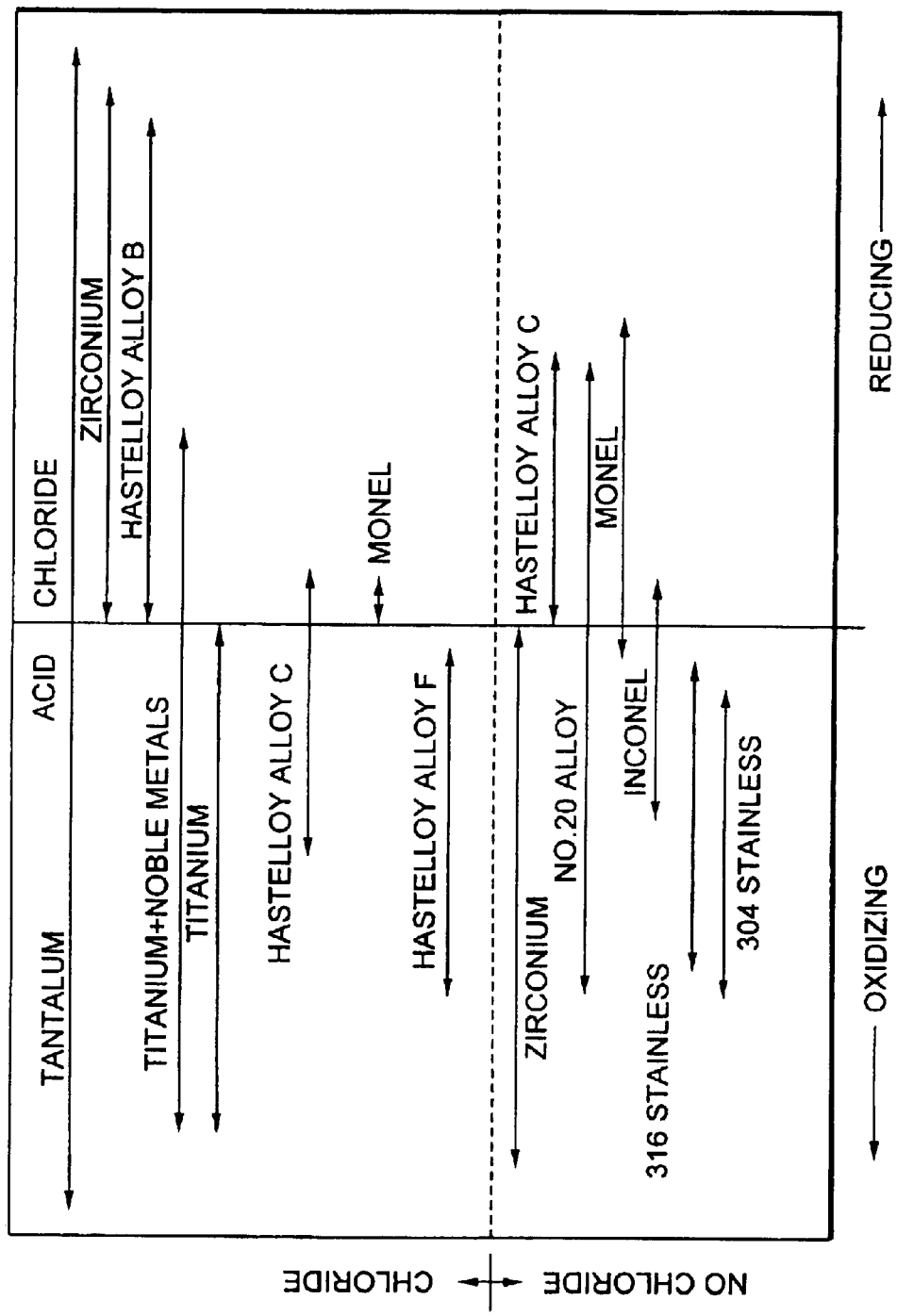
FIG. 16 is a diagram showing applicable ranges of various kinds of passive materials.
Figure 17:
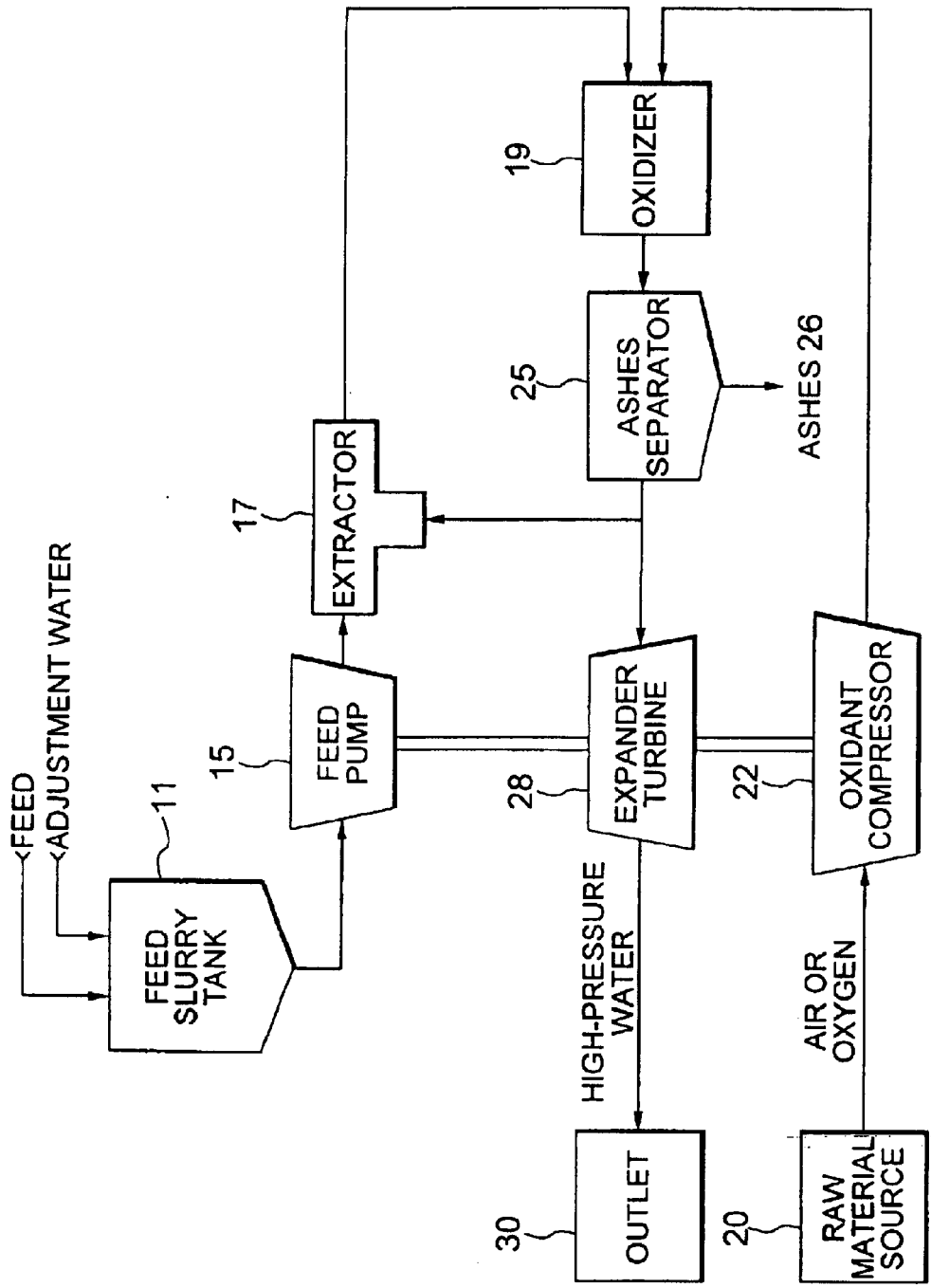
FIG. 17 is a diagram showing a conventional example of a feeder for feeding solid material to a high-pressure reactor.
Figure 18:
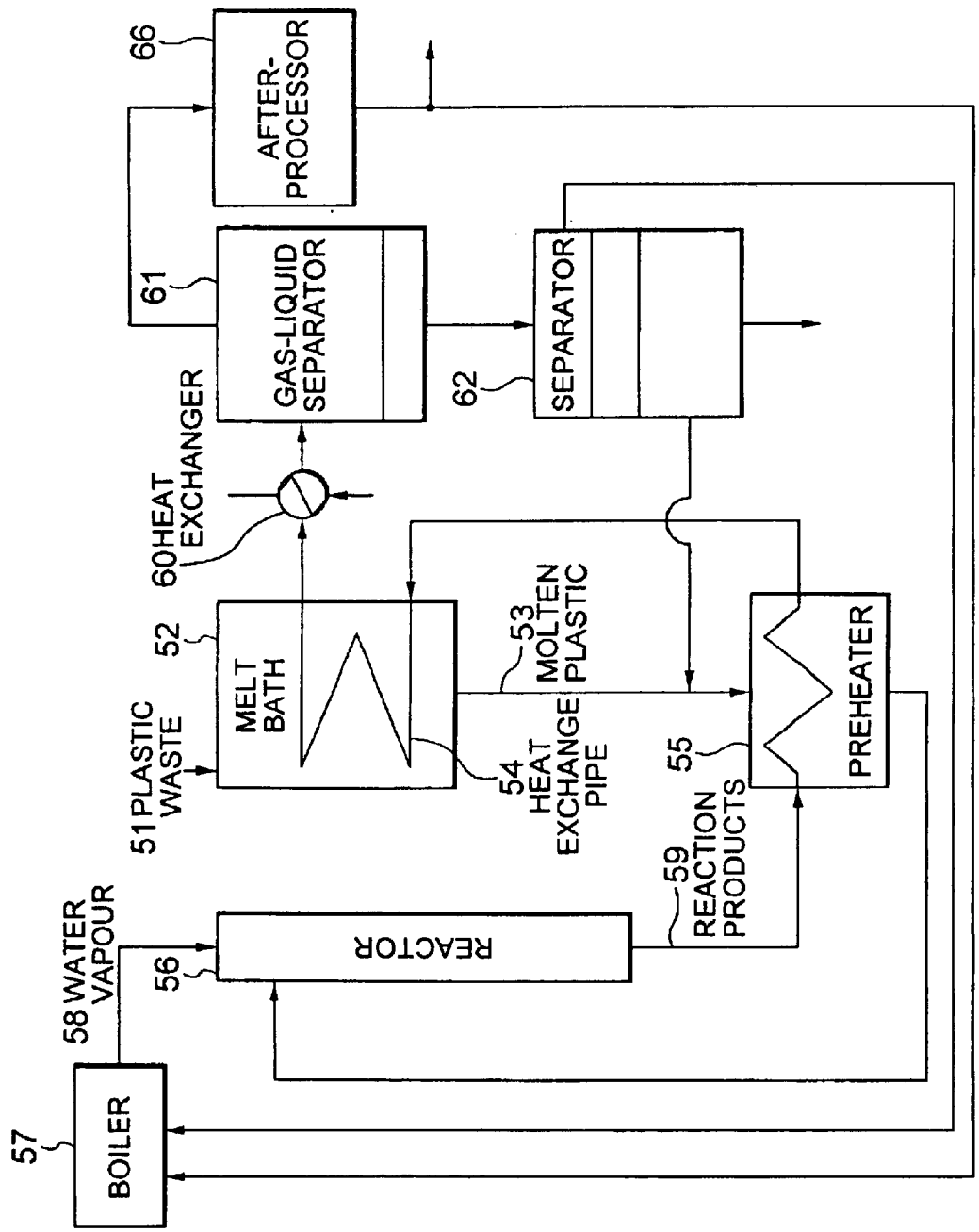
FIG. 18 is a diagram showing another conventional example of a feeder for feeding solid material to a high-pressure reactor.

In the present embodiment, since the chloride concentration is approximately 1% and an atmosphere is oxidizing, the high-pressure reactor 200 made of Ti alloy or lined with Ti alloy is used (see; FIG. 16)

Next, a method using the aforementioned high-pressure reactor to process solid waste is described. First, the step of feeding solid waste to the high-pressure reactor 200 is explained with reference to FIGS. 1 to 4.

(a) As shown in FIG. 1, with the first reciprocating switchgear 102 closed and a cover 99 opened, under the atmospheric condition, the solid waste is reserved in the first solid reservoir 101.

Figure 2:
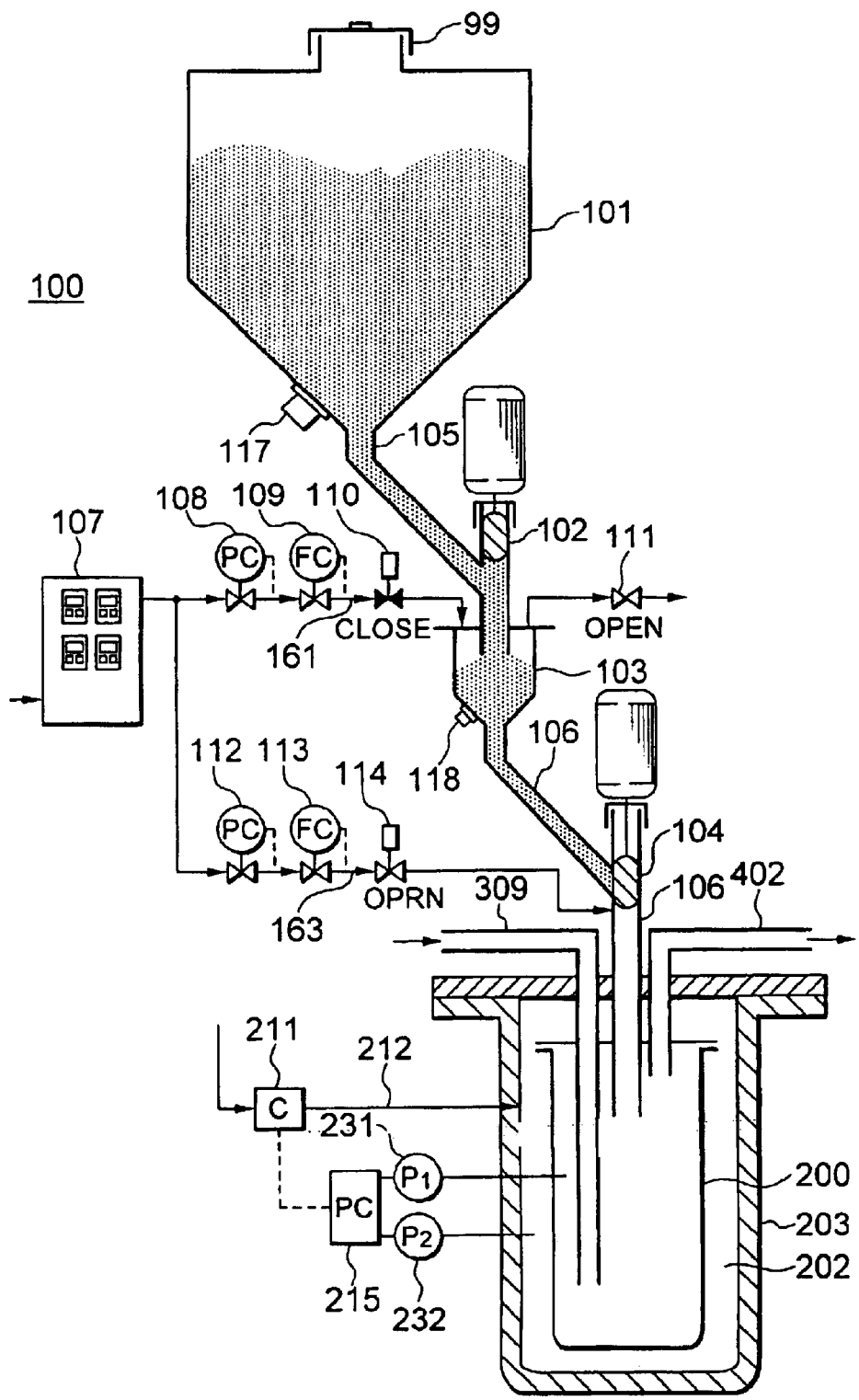
FIG. 2 is a schematic diagram (1) showing a solid feeding method in a high-pressure treatment apparatus of FIG. 1.

(b) As shown in FIG. 2, with the second reciprocating switchgear 104 closed, the first switching valve 110 closed and a pressure relief valve 111 opened, in a state where a vibrator 117 is operated, the first reciprocating switchgear 102 is opened.

At this time, the second switching valve 114 for feeding the high-pressure fluid 163 to the second feed pipe 106 between the second reciprocating switchgear 104 and the high-pressure reactor 200 is opened to feed the high-pressure fluid 163 from the high-pressure fluid feeder 107. The second pressure control unit 112 and the second flow control unit 113 control the pressure and flow rate of the high-pressure fluid 163 so that the fluid of higher pressure than that of the inside of the high-pressure reactor 200 is made to flow a little from the second solid reservoir 103 side to the high-pressure reactor 200 side.

Thus, the solid waste inside of the first solid reservoir 101 is partly transferred through the first feed pipe 105 to the second solid reservoir 103. Due to vibration of the vibrator 117, cross-linking of the solid waste can be prevented from occurring. Thereby, the first feed pipe 105 and an outlet of the first solid reservoir 101 can be prevented from being clogged. With the pressure relief valve 111 kept opened, even the solid waste is transferred from the first solid reservoir 101 to the second solid reservoir 103, the pressure of the upper space of the second solid reservoir 103 can be kept at atmospheric pressure identical with the pressure of the upper space of the first solid reservoir 101.

In addition, with the second switching valve 114 opened, feed pressure and flow rate of the fluid 163 are controlled so that the fluid within the high-pressure reactor 200 is prevented from entering into the object feeding system 100 side.

Figure 3:
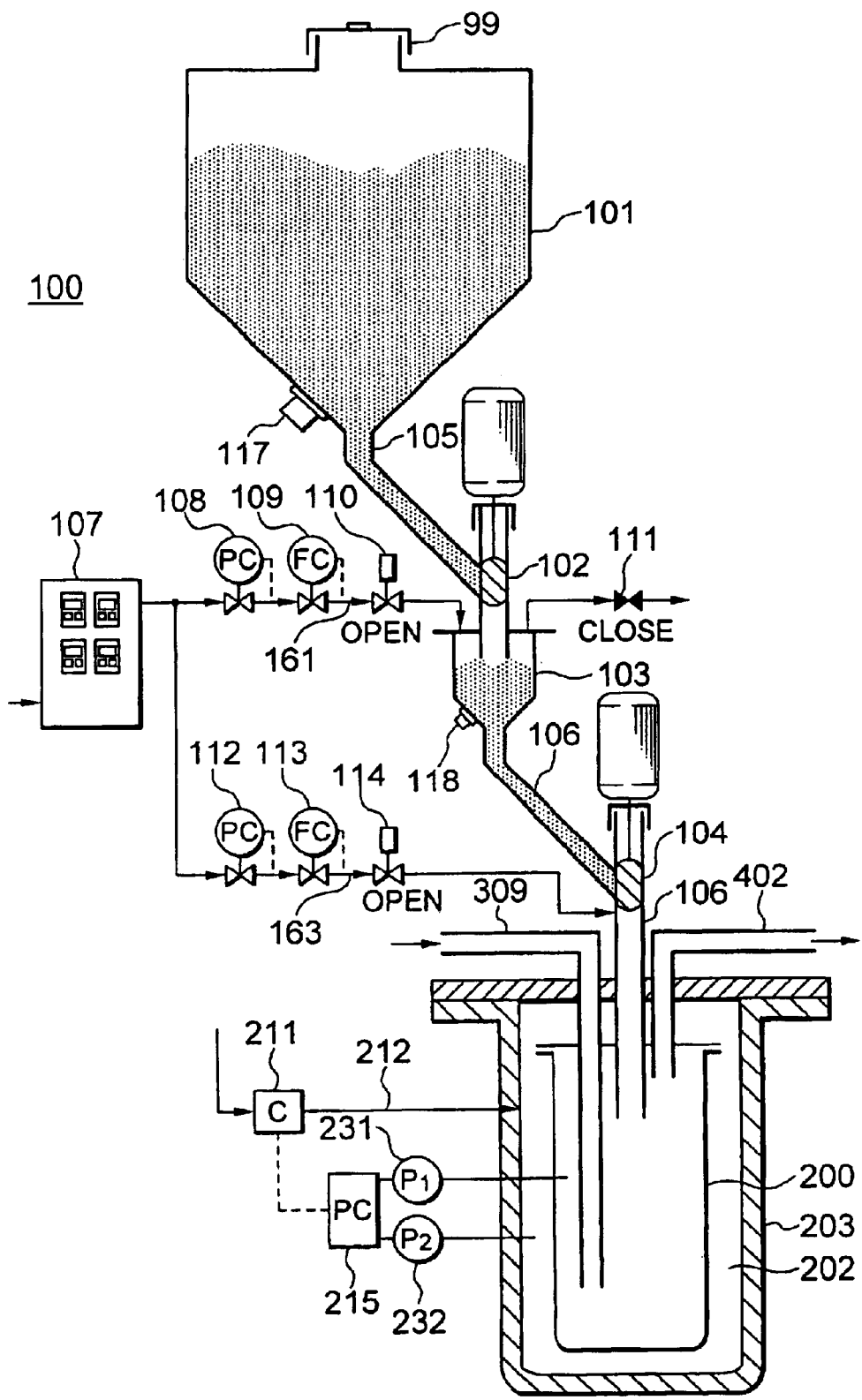
FIG. 3 is a schematic diagram (2) showing a solid feeding method in a high-pressure treatment apparatus, of FIG. 1.

(c) As shown in FIG. 3, with the second reciprocating switchgear 104 kept closed, the first reciprocating switchgear 102 is closed, the pressure relief valve 111 is closed and the first switching valve 110 is opened.

The fluid 161 is fed from the high-pressure fluid feeder 107 to the inside of the second solid reservoir 103. The feed pressure of the fluid 161 is controlled by the first pressure control unit 108 so that the pressure of the inside of the second solid reservoir 103 is higher than the pressure of the fluid flowing the inside of the second feed pipe 106 from the second reciprocating switchgear 104 side to the high-pressure reactor 200 side and the pressure of the inside of the high-pressure reactor 200. Pressure rise rate inside of the second solid reservoir 103 is controlled by controlling the flow rate of the high-pressure fluid with the first flow control unit 109.

By carrying out in this way, when the second reciprocating switchgear 104 is opened in the next step (d), the fluid within the high-pressure reactor 200 and the fluid within the second feed pipe 106 between the second reciprocating switchgear 104 and the high-pressure reactor 200 are prevented from entering into the second solid reservoir 103.

In addition, following the step (b), with the second switching valve 114 kept opened to flow the high-pressure fluid 163 on from the high-pressure fluid feeder 107, the fluid inside of the high-pressure reactor 200 can be prevented from entering into the object feeding system 100 side.

Figure 4:
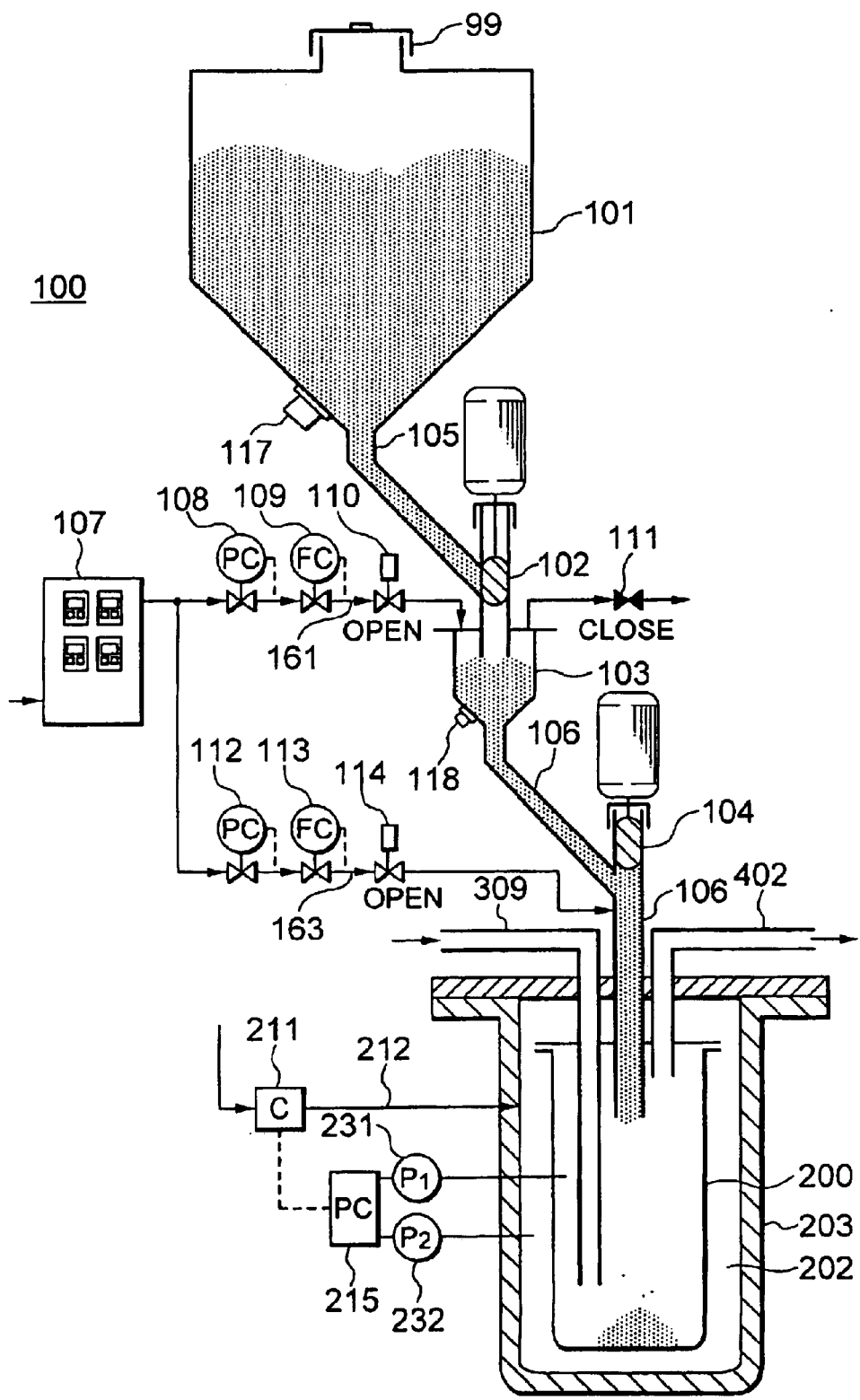
FIG. 4 is a schematic diagram (3) showing a solid feeding method in a high-pressure treatment apparatus of FIG. 1.

(d) As shown in FIG. 4, the second reciprocating switchgear 104 is opened and the vibrator 118 is operated. With the first switching valve 110 kept opened, so that the fluid within the high-pressure reactor 200 and the fluid within the second feed pipe 106 between the second reciprocating switchgear 104 and the high-pressure reactor 200 does not enter into the second solid reservoir 103, the high-pressure fluid 161 of higher pressure than that of the high-pressure fluid 163 is kept feeding to the second solid reservoir 103. The feed pressure and flow rate of the high-pressure fluid 161 are controlled with the first pressure control unit 108 and the first flow control unit 109.

Following the step (c), with the second switching valve 114 kept opened, the high-pressure fluid 163 is kept flowing from the high-pressure fluid feeder 107.

Thus, the solid waste inside of the second solid reservoir 103 is transferred to the high-pressure reactor 200. At this time, due to vibration of the vibrator 118, the solid waste is prevented from cross-linking to result in clogging of the second feed pipe 106 and the outlet of the second solid reservoir 103.

When the solid waste within the second solid reservoir 103 is fed into the high-pressure reactor 200, unless something is fed to supplement a gap generated due to decrease of the solid waste of the second solid reservoir 103, the fluid within the high-pressure reactor 200 may flow backwards to the object feeding system 100 side. However, by controlling the pressures and the flow rates of the high-pressure fluids 161 and 163 to build up pressure gradient decreasing from the second solid reservoir 103 towards the high-pressure reactor 200, the fluid within the high-pressure reactor 200 can be prevented from entering into the object feeding system 100 side.

That is, the pressure within the interval from the first reciprocating switchgear 102 to the second reciprocating switchgear 104 (including the second solid reservoir 103), the pressure within the second feed pipe 106 from the second reciprocating switchgear 104 up to the high-pressure reactor 200 and the pressure of the high-pressure reactor 200 are installed to decrease in this order by slightly. Thereby, backward flow can be prevented from occurring.

In the present embodiment, when the pressure within the high-pressure reactor 200 is 30.00 MPa, the pressure of the fluid at the high-pressure fluid feeder 107 is set at 32.00 MPa, that of the fluid 161 within the piping between the first pressure control unit 108 and the first flow control unit 109 is set at approximately 30.02 MPa, and the pressure of the fluid 163 within the piping between the second pressure control unit 112 and the second flow control unit 113 is set at approximately 30.01 MPa. Without restricting these pressures to the aforementioned values, any pressure values that can prevent the backward flow from occurring from the high-pressure reactor 200 to the feeding system 100 side and that can efficiently feed the solid waste to the high-pressure reactor 200 can be set.

(e) When the solid waste within the second solid reservoir 103 is entirely fed to the high-pressure reactor 200, the step (b) is started again to repeat the steps of (b) to (d).

(f) When the solid waste within the first solid reservoir 101 is entirely fed, the step (a) is started again.

Instead of at the time when the entire solid waste within the first solid reservoir 101 is fed, at the time when the remaining amount of the solid waste within the first solid reservoir 101 becomes less than the prescribed amount, the step (a) may be taken up again.

Thus, the solid waste fed to the high-pressure reactor 200 is oxidized with the super-critical water as the reaction medium to result in decomposition.

To the high-pressure reactor 200, water that is the reaction medium and hydrogen peroxide that is an oxidant are fed from the water tank 307 and the hydrogen peroxide water tank 308 after pressurized by the pumps 303 and 304 respectively and heated by the pre-heater 305.

In the present embodiment, the conditions within the high-pressure reactor 200 are set as follows. That is, the temperature and the pressure are 400° C. and 30 MPa that are above the critical point of water. There is installed no heater inside of the high-pressure reactor 200. However, by feeding the reaction medium while heating by the pre-heater 305, the reaction within the high-pressure reactor 200 can be initiated and the temperature inside of the high-pressure reactor 200 can be held high due to the heat of decomposition.

Naturally, according to the kinds of the treatment objects, reaction media and aimed reactions, the heater can be installed inside of the vessel. Further, by using the heater only for start-up heating, the heat source during running of the apparatus can rely on the reaction products. In such cases, the heater is preferable to be formed into a structure in which cooling gas can be flowed to suppress corrosion of the surface thereof from occurring.

Within the high-pressure reactor 200 and gap 202, water is fed by a pump 211 through the duct 212. The pressure sensors 231 and 232 measure the pressures of the waters. Based on the measured values, the pressure controller 215 maintains the pressure of the water within the gap 202 higher than that of the inside of the high-pressure reactor 200 by approximately 0.5 MPa to 5 MPa.

In the high-pressure treatment apparatus of the present invention, the pressure sensors 231 and 232 are installed to the high-pressure reactor 200 and gap 202. However, there are cases when the inside of the reactor is high temperature and high pressure and the temperature sensor and the pressure sensor are difficult to install. In such cases, instead of measuring directly the temperature and pressure inside of the reactor, the temperature and the pressure of the mixture of the medium and the waste before feeding into the reactor can be measured to calculate or estimate the temperature and the pressure inside of the reactor from the obtained values.

Thus, within the high-pressure reactor 200, decomposition and oxidation reactions occur under super-critical condition to convert the plastic waste finally into water and carbon dioxide. The generated reaction products enter into the product exhaust pipe 402 and, after cooled at the cooler 403, are exhausted into the decomposition product stock tank 401 through the pressure hold valve 404.

As described in the above, according to the high-pressure treatment apparatus involving the present embodiment, the solid waste within the first solid reservoir 101, without preparing in slurry form or melting, can be fed into the high-pressure reactor 200. Accordingly, dry solid waste that is particularly difficult to handle in the past can be fed.

In the present embodiment, in controlling the pressure and flow rate of the fluid fed from the high-pressure fluid feeder 107 with the first and second pressure control units 108 and 112 and the first and second flow control units 109 and 113 to feed the solid waste from the second solid reservoir 103 to the high-pressure reactor 200, the pressure of the interval between the first reciprocating switchgear 102 to the second reciprocating switchgear 104 (including the second solid reservoir 103), the pressure inside of the second feed pipe 106 from the second reciprocating switchgear 104 up to the high-pressure reactor 200, and the pressure within the high-pressure reactor 200 are set to decrease in this order by slightly to build up a pressure gradient.

With such a constitution, the fluid is kept flowing always from the feeding system 100 to the high-pressure reactor 200 side to result in firm prevention of back flow of the fluid from the high-pressure reactor 200 to the feeding system 100 side. Thereby, safety of the apparatus can be improved.

In the high-pressure treatment apparatus of the present embodiment, from the first solid reservoir 101 of larger volume to the second solid reservoir 103 of smaller volume the solid waste is fed by dividing into small portions under atmospheric pressure, and from the second solid reservoir 103 to the high-pressure reactor 200 under high pressure. This entire process is repeated.

Accordingly, the first solid reservoir 101 is not required to be pressure-resistant to enable the pressure-resistant portion to be smaller than the existing one. Thereby, the apparatus cost can be decreased. In addition, by making smaller the volume of the second solid reservoir 103 than that of the first solid reservoir 101, the pressure-resistant portion can be made further smaller.

In feeding the solid waste from the second solid reservoir 103 to the high-pressure reactor 200, gravity can be used to simplify the structure for feeding the solid waste from the second solid reservoir 103 to the high-pressure reactor 200.

To the first solid reservoir 101 and the second solid reservoir 103, the vibrators 117 and 118 are installed, respectively. Thereby, in feeding the solid waste within the first solid reservoir 101 and the solid waste within the second solid reservoir 103, the respective solid wastes can be prevented from bridging to result in clogging.

As the first and second sealing units, reciprocating switchgears 102 and 104 are used. Thereby, a large pass area of the solid waste can be secured and the high-pressure fluid can be sealed firmly.

The pressure inside of the gap 202 is set higher than that of the high-pressure reactor 200. As a result of this, compressive stress exerts on the high-pressure reactor 200 to result in less occurrence of damage such as fracture. Accordingly, materials that are not large in high-temperature strength but high in corrosion-resistance can be used as high-pressure reactor materials. Thus, the range of selection of the high-pressure reactor materials is made larger. In addition, the high-pressure reactor 200 can be formed thinner to result in the cost reduction.

By installing the high-pressure reactor 200 inside of the exterior vessel 203, the pressure sensor 232 can be installed between the exterior vessel 203 and the high-pressure reactor 200 to check leakage of the high-pressure reactor 200.

Further, even when the high-pressure reactor 200 is fractured, since the leaked product does not directly contact with the atmosphere, safety of the apparatus can be heightened. In particular, when radioactive waste is decomposed, since contamination does not diffuse outside of the exterior vessel 203, repair work and replacement can be implemented with ease.

The high-pressure reactor 200 or the surface thereof, according to the kind of the waste, can be constituted of an appropriate material of high corrosion-resistance to protect the high-pressure reactor from corrosion. Thereby, a high-pressure treatment apparatus less expensive and excellent in durability can be provided.

(Embodiment 2)

Figure 5:
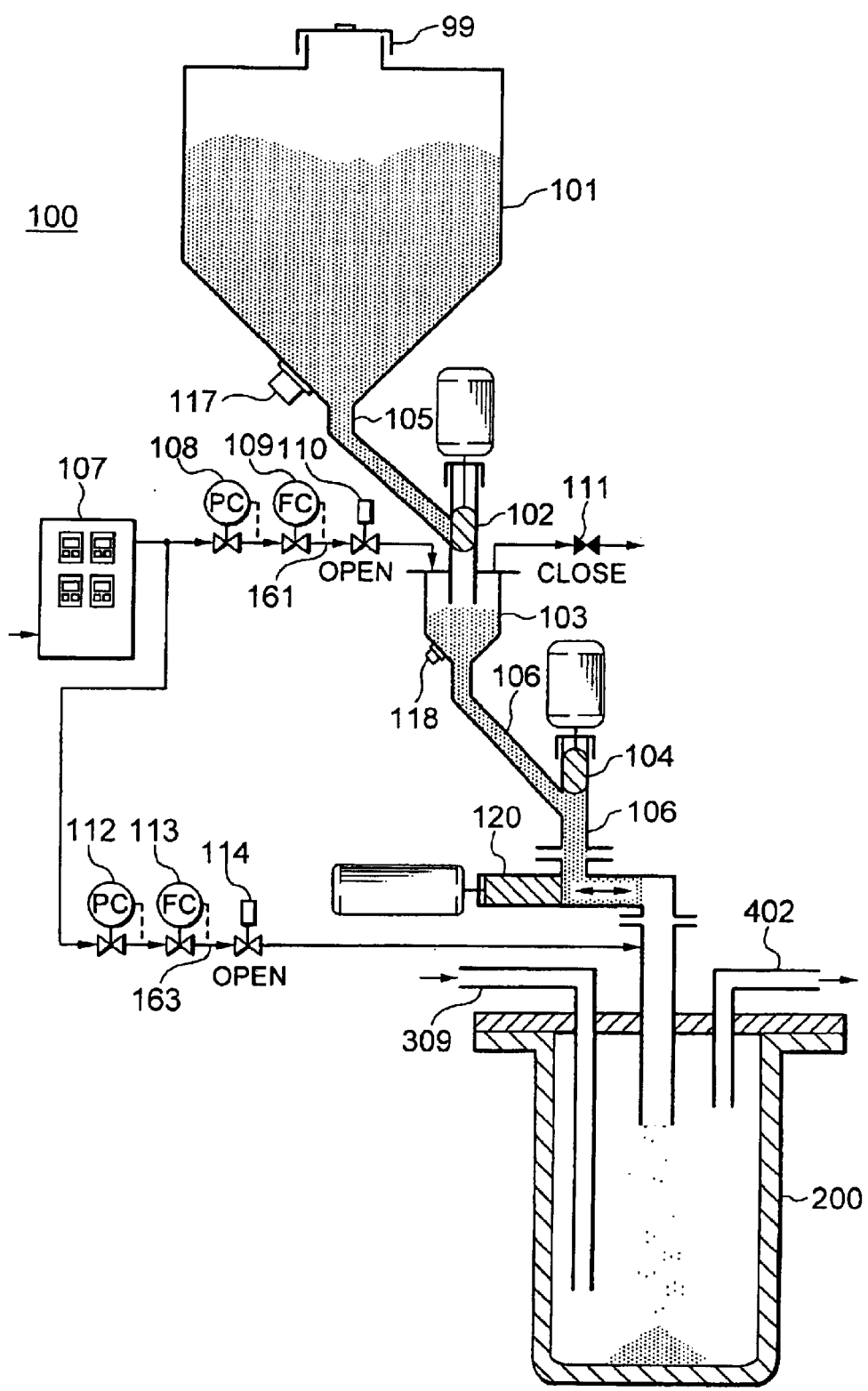
FIG. 5 is a schematic diagram showing a high-pressure treatment apparatus of embodiment 2 of the present invention.

A treatment object feeding system 100 of a high-pressure treatment apparatus involving the present embodiment is schematically shown in FIG. 5.

The treatment apparatus of embodiment 2 is constituted in an identical structure with that of embodiment 1 except that a high-pressure reactor 200 is formed of single vessel and a piston 120 is used to feed solid waste from a second solid reservoir 103 of an object feeding system 100 to the high-pressure reactor 200.

The high-pressure reactor 200 is made of thick stainless steel plate to be pressure-resistant and the inner surface thereof is lined with titanium alloy.

As shown in FIG. 5, between a second reciprocating switchgear 104 and the high-pressure reactor 200, a piston 120 is installed to reciprocate a part inside of a second feed pipe 106. An outside diameter of the piston 120 is set at a value that does not allow the solid waste enter between an inner wall of the second feed pipe 106 and the piston 120.

In processing actually, in the identical manner as step (a) through step (d) mentioned in embodiment 1, the apparatus is operated. In the step (d), the piston 120 is moved and pushes out the solid waste built up in the second feed pipe 106 by falling from the second solid reservoir 103, to result in falling into the high-pressure reactor 200. When the piston 120 is positioned at the most receded position (the left-hand side of FIG. 5 is the receding direction), the second feed pipe 106 is completely opened and secures a wide pass area of the solid waste. However, as the piston 120 is forwarded (the right-hand side of FIG. 5 is the forwarded direction), the opening of the pass area of the solid waste of the second feed pipe 106 is narrowed and at the maximum forward position the second feed pipe 106 is completely closed. The piston 120 reached to the maximum-forward position moves next towards the most receded position.

By repeating this reciprocating movement, the solid waste within the second solid reservoir 103 can be intermittently fed a little at a time into the high-pressure reactor 200.

Thus, in the high-pressure treatment apparatus of the present embodiment, in addition to the effects obtained by embodiment 1, the solid waste can be intermittently fed a little at a time. Thereby, the range of fluctuation of conditions such as the temperature, pressure and composition inside of the high-pressure reactor 200 can be made smaller to contribute in improvement of processing efficiency and safety.

(Embodiment 3)

Figure 6:
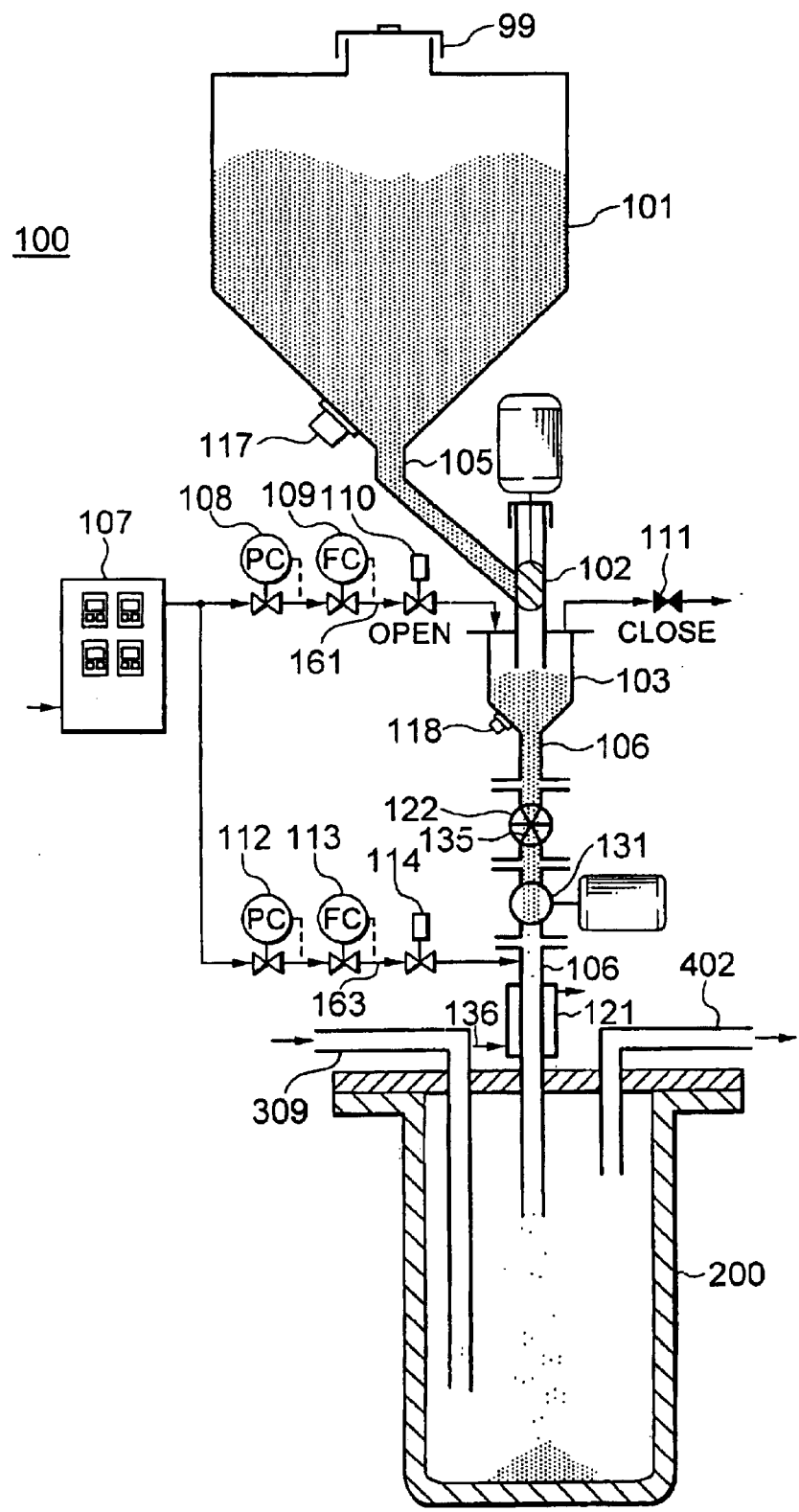
FIG. 6 is a schematic diagram showing a high-pressure treatment apparatus of embodiment 3 of the present invention.

A feeding system 100 of a high-pressure treatment apparatus involving the present embodiment is schematically shown in FIG. 6.

The treatment apparatus of embodiment 3 is constituted identically with that of embodiment 1 except that a high-pressure reactor 200 is formed in single vessel and a rotary-feeder 122 is used to feed solid waste from a second solid reservoir 103 of an object feeding system 100 to the high-pressure reactor 200, as a second sealing unit a ball valve 131 is used and a cooling unit 121 is installed at a position close to the high-pressure reactor 200 of the second feeding pipe 106.

As identical with embodiment 2, the high-pressure reactor 200 is made of thick stainless steel to be pressure-resistant and the inner surface thereof is lined with titanium alloy.

As shown in FIG. 6, between the second solid reservoir 103 and the high-pressure reactor 200, a rotary feeder 122 with a rotary vane 135 is installed.

Downstream of the rotary feeder 122, a ball valve 131 is installed as a second sealing unit.

To the second feeding pipe 106 downstream of the ball valve 131, a cooling unit 121 is installed. The cooling unit 121 is a water-cooling type and the second feeding pipe 106 is cooled by cooling water 136.

In an actual processing, in the identical way as the step (a) through step (d) of embodiment 1, the apparatus is operated.

Upon operating the rotary feeder 122 with the ball valve 131 opened, the solid waste within the second solid reservoir 103, due to rotation of the rotary-vane 135 of the rotary feeder 122, is fed into the high-pressure reactor 200 through the ball valve 131. Through control of the speed of rotation of the rotary-vane 135, the feeding speed can be controlled.

Thus, in the treatment apparatus of the present embodiment, due to the use of the rotary feeder 122, in addition to the effects obtained in embodiment 1, the solid waste in the second solid reservoir 103 can be continuously and quantitatively fed into the high-pressure reactor 200. Thereby, the range of fluctuation of conditions such as the temperature, pressure and composition within the high-pressure reactor 200 can be made smaller, to result in improvement of processing efficiency and safety.

Due to the adoption of the ball valve 131 as the second sealing unit, as identical as the case of embodiment 1 where a reciprocating switchgear 104 is used, a wide pass area of the solid waste can be secured and the high-pressure fluid can be firmly sealed. In addition, a space necessary for the reciprocating movement of the reciprocating switchgear 104 and the driving force against the pressure of the high-pressure reactor 200 become unnecessary, resulting in realization of a smaller second sealing unit than that of embodiment 1.

In operating the ball valve 131, by stopping the rotary feeder 122, the ball valve 131 can be opened and shut in the absence of the solid waste. Accordingly, the solid waste can be made less probable in nipping into the ball valve 131.

Further, by installing the cooling unit 121, even when the temperature of the high-pressure reactor 200 is high, the temperature of the apparatus from the cooling unit 121 up to the first reciprocating switchgear 102 can be kept low. Upon cooling with water like in this embodiment, the temperature can be maintained below 100° C.

From the cooling unit 121 up to the first reciprocating switchgear 102, being exposed to high-pressure, a thickness of material is made thick. Further, since under high temperatures, the strength of material deteriorates, the portion that is exposed to high temperatures is necessary to be made further thicker. Disposition of the cooling unit 121 enables to maintain the temperature of the portion from the cooling unit 121 to the first reciprocating switchgear 102 low, resulting in doing without thickening the thickness of the necessary portion. Thereby, the apparatus can be smaller and the cost can be reduced. Further, the range of selection of materials being used for such as structural materials and pressure-resistant sealing materials can be made broader.

(Embodiment 4)

Figure 7:
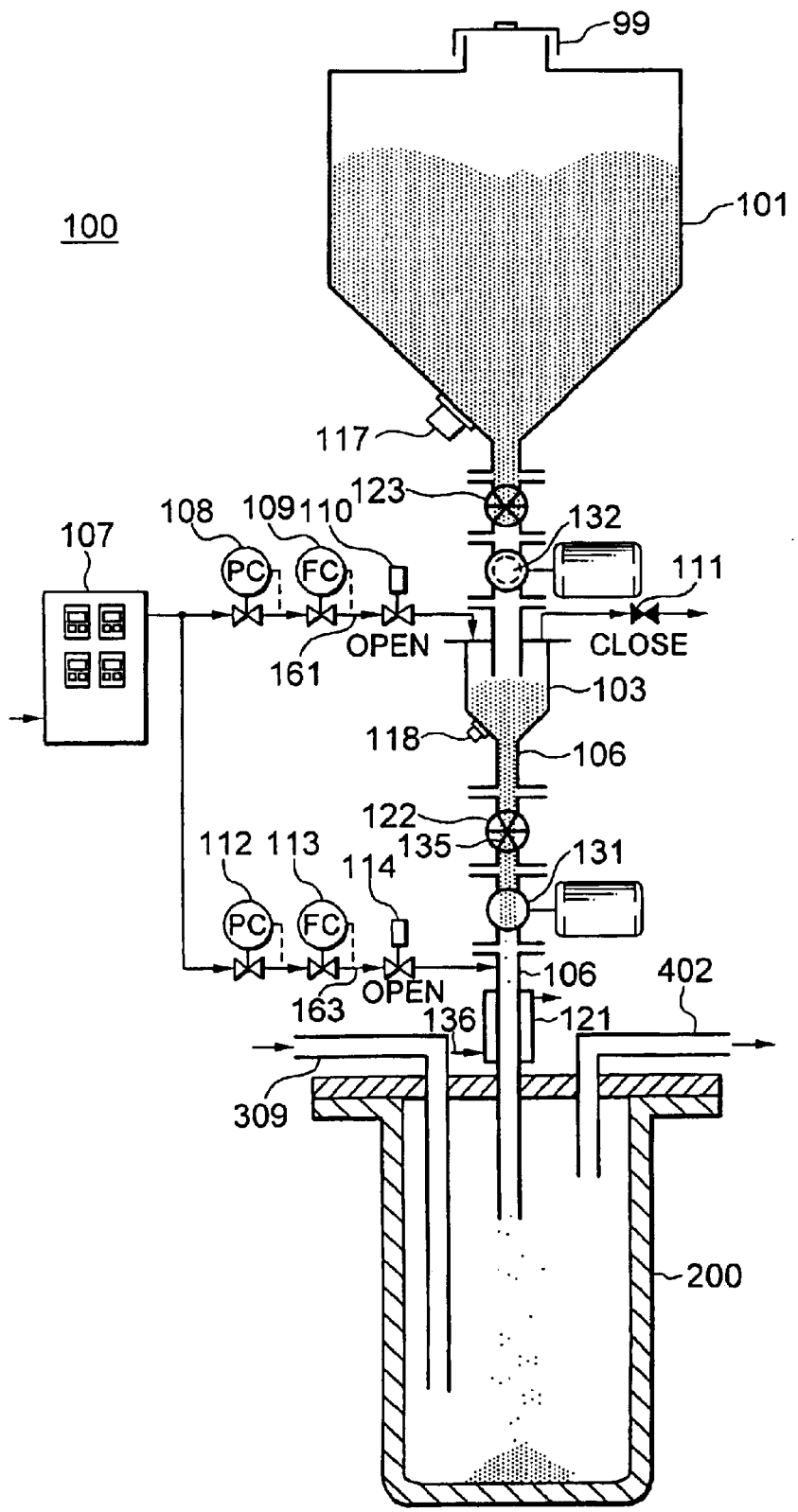
FIG. 7 is a schematic diagram showing a high-pressure treatment apparatus of embodiment 4 of the present invention.

A feeding system 100 of a treatment object of the treatment apparatus involving the present embodiment is schematically shown in FIG. 7.

The treatment apparatus of embodiment 4 has an identical structure with that of embodiment 3 except that a rotary feeder is used also for feeding the solid waste from the first solid reservoir 101 of the object feeding system 100 to the second solid reservoir 103 and the ball valve is used also for the first sealing unit.

As shown in FIG. 7, rotary feeders 123 and 122 are installed, respectively, between the first solid reservoir 101 and the second solid reservoir 103 and between the second solid reservoir 103 and the high-pressure reactor 200. In addition, downstream the rotary feeders 123 and 12, the ball valves 132 and 131 are installed, respectively.

In the present embodiment, the ball valves are used for the first and second sealing units. As identical as the case where the reciprocating switchgear is used, the broad pass area of the solid waste can be secured and the high-pressure fluid can be firmly sealed. In addition to such effects, the space necessary for reciprocating movement and the pressure when the second solid reservoir 103 is pressurized or the driving force against the pressure of the high-pressure reactor 200 are made unnecessary. Thus, the first and second sealing units can be made small.

By using the rotary feeders 123 and 122, the solid waste being fed from the first solid reservoir 101 to the second solid reservoir 103 and the solid waste being fed from the second solid reservoir 103 to the high-pressure reactor 200 can be continuously and quantitatively fed. In addition, by shutting off the corresponding rotary feeder in operating the ball valve, in the absence of the solid waste, the corresponding ball valve can be opened and shut. As a result of this, the ball valve can be made less probable to be nipped by the solid waste.

(Embodiment 5)

Figure 8:
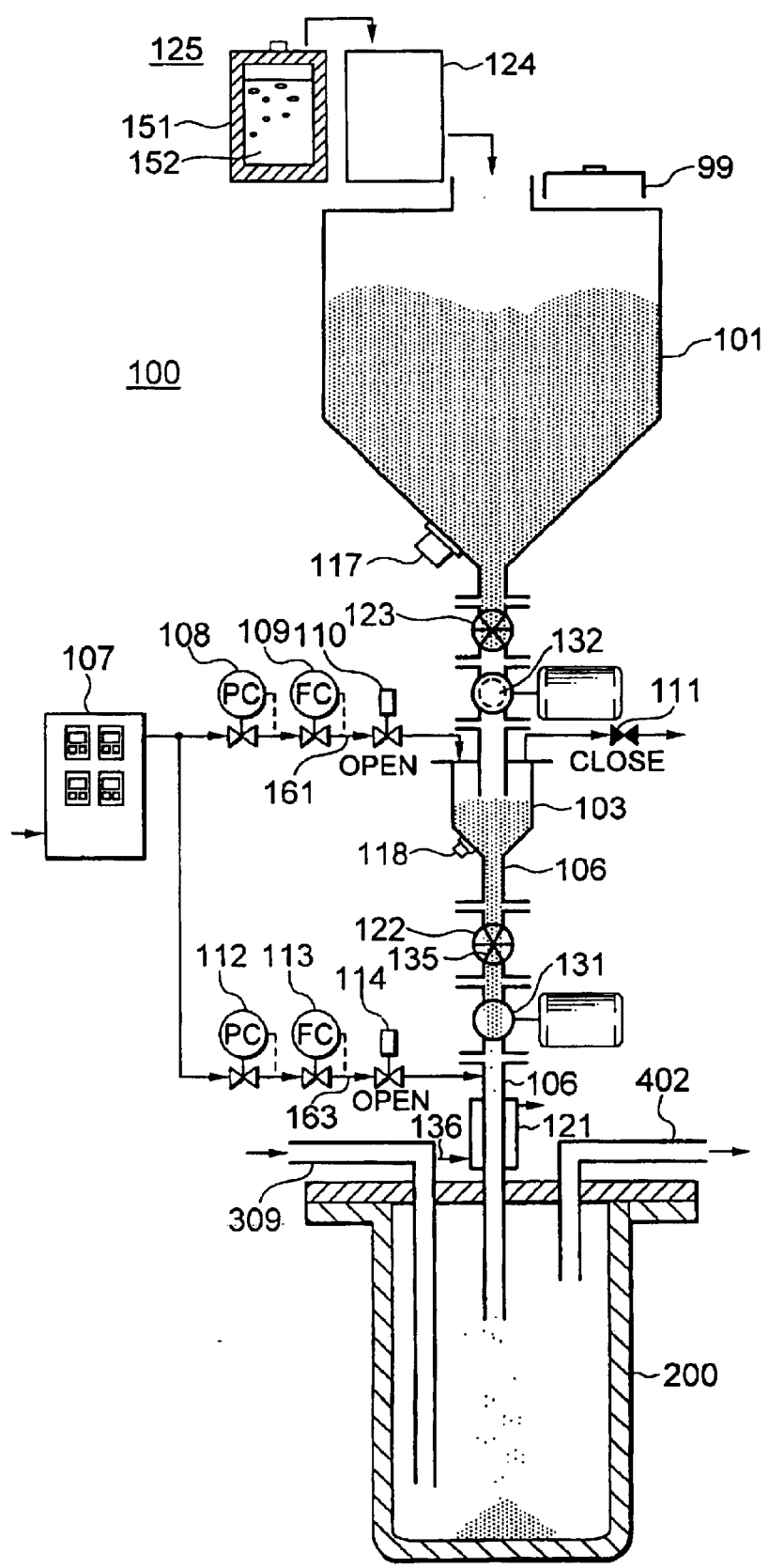
FIG. 8 is a schematic diagram showing a high-pressure treatment apparatus of embodiment 5 of the present invention.

FIG. 8 is a schematic diagram showing a feeding system 100 of a treatment object of the treatment apparatus involving the present embodiment.

The treatment apparatus of the embodiment 5 has the identical structure with that of embodiment 4 except that the feeding system 100 of treatment object comprises a primary crusher.

For the primary crusher 124, an impact crusher is used. An impact crusher is one that carries out primary crushing of solid due to repeated impact between a rotating impact hammer and an impact plate (see Perry's Chemical Engineers' Handbook, Sixth Edition 8 to 53).

For instance, when processing coal including blocks of a maximum dimension of approximately 60 mm as the object, so as to go through the first and second feed pipes 105 and 106 (the inner diameters thereof: 50 mm), coal is crushed to the maximum dimension of approximately 5 mm or less with an impact crusher. Thereafter, the crushed coal is stocked in the first solid reservoir 101.

When elastic materials such as used polyethylene bottles and gloves are employed as the treatment object, it is difficult to crush by the impact crusher only. When such elastic materials have low temperature brittleness, liquid nitrogen 152 is poured into a container 151 insulated by heat insulator, therein the used polyethylene bottles and gloves are immersed. Thereafter, the object is transferred to the primary crusher 124 to implement primary crushing.

In the present embodiment, by installing the primary crusher 124, in addition to the effects obtained in embodiment 4, the solid in block can be fed to the high-pressure reactor. Further, when materials of low temperature brittleness are exposed to the primary crushing, a low temperature primary crusher 125 constituted of an adiabatic container 151 insulated by heat insulator, liquid nitrogen 152 and a primary crusher 124 can be effectively employed to crush the object.

(Embodiment 6)

Figure 9:
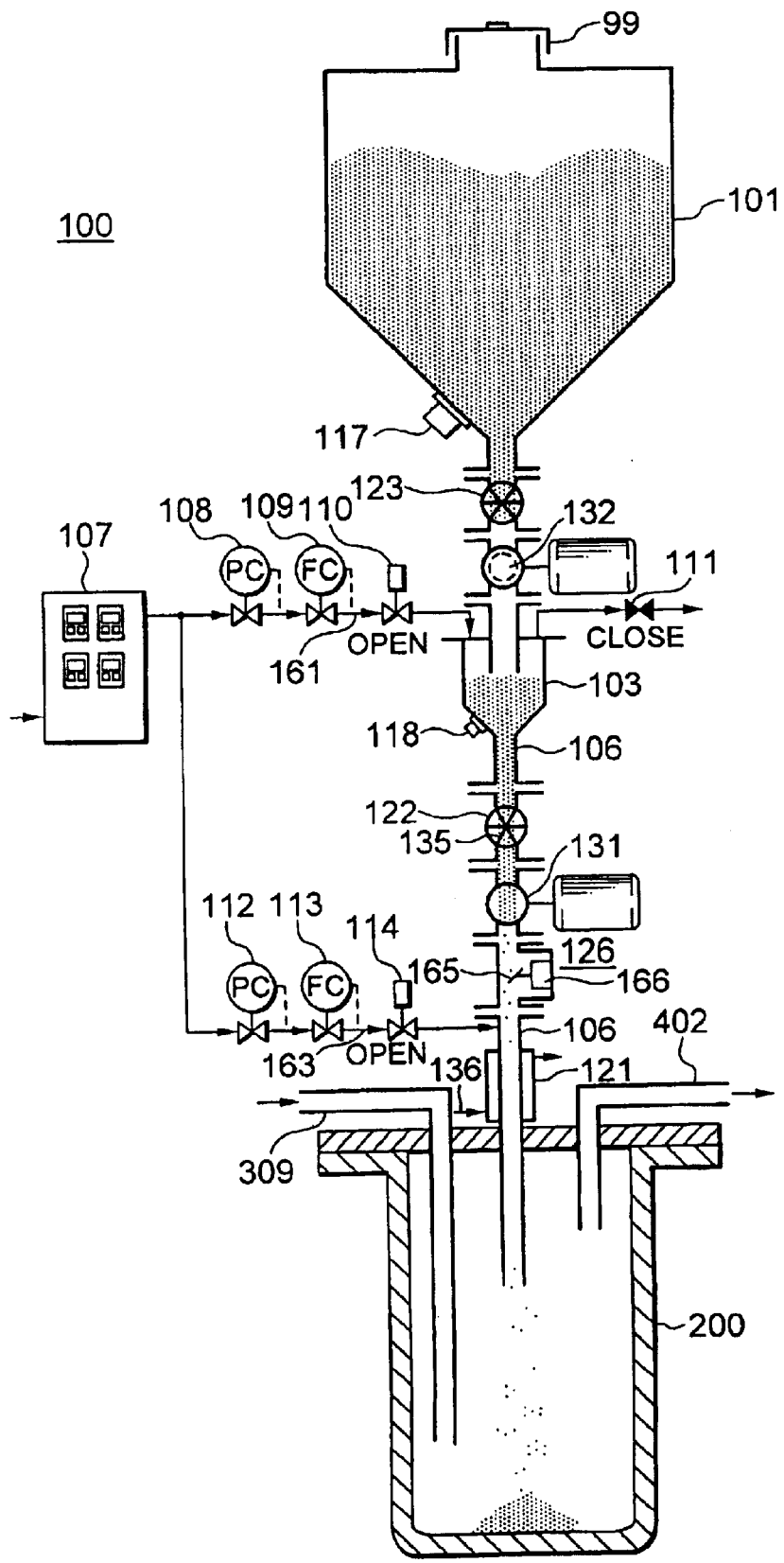
FIG. 9 is a schematic diagram showing a high-pressure treatment apparatus of embodiment 6 of the present invention.

FIG. 9 is a schematic diagram showing an object feeding system 100 of the treatment apparatus involving the present embodiment.

The treatment apparatus of the embodiment 6 has the same structure with that of embodiment 4 except that the feeding system 100 of treatment object comprises a solid feed speed measuring unit 126.

As shown in FIG. 9, to the second feed pipe 106 between the ball valve 131 and the high-pressure reactor 200, a solid feed speed measuring unit 126 consisting of a detecting plate 165 and a measurement unit 166 of impact load is installed.

In the step (d), when the ball valve 131 is opened and the solid waste within the second solid reservoir 103 is continuously fed by the rotary feeder 122 to the high-pressure reactor 200, the solid waste gone down within the feed pipe collides the detecting plate 165 of the flow rate measuring unit 126 installed in the midway of the second feed pipe 106. The impact load at this time is known to be in proportion to the flow amount of the solid waste ([measurement and control of flow rate of powder], Chemical Engineering, vol.62, No.7, p379 (1998)). The impact load is converted into an electrical signal by use of the impact-load measurement unit 166 to measure the flow rate of the solid waste.

In this embodiment, the disposition of a feed speed measurement unit 126 enables to feed the solid waste while checking the feed speed. In addition to this, the amount of the solid waste fed into the high-pressure reactor 200 can be obtained. Accordingly, from these, the time when the entire solid waste within the second solid reservoir 103 is fed can be detected. Accordingly, in step (e), the timing returning to the [step (b)] of feeding the solid waste from the first solid reservoir 101 to the second solid reservoir 103 or returning to [step (a)] of feeding the solid waste to the first solid reservoir 101 can be obtained.

In a high-pressure treatment apparatus requiring pressure-resistant function, it is difficult to observe the inside of the apparatus. However, according to the present embodiment, the apparatus can be operated while confirming the feed speed of the solid waste, in addition to this, the switching time of the operating mode can be accurately detected.

(Embodiment 7)

Figure 10:
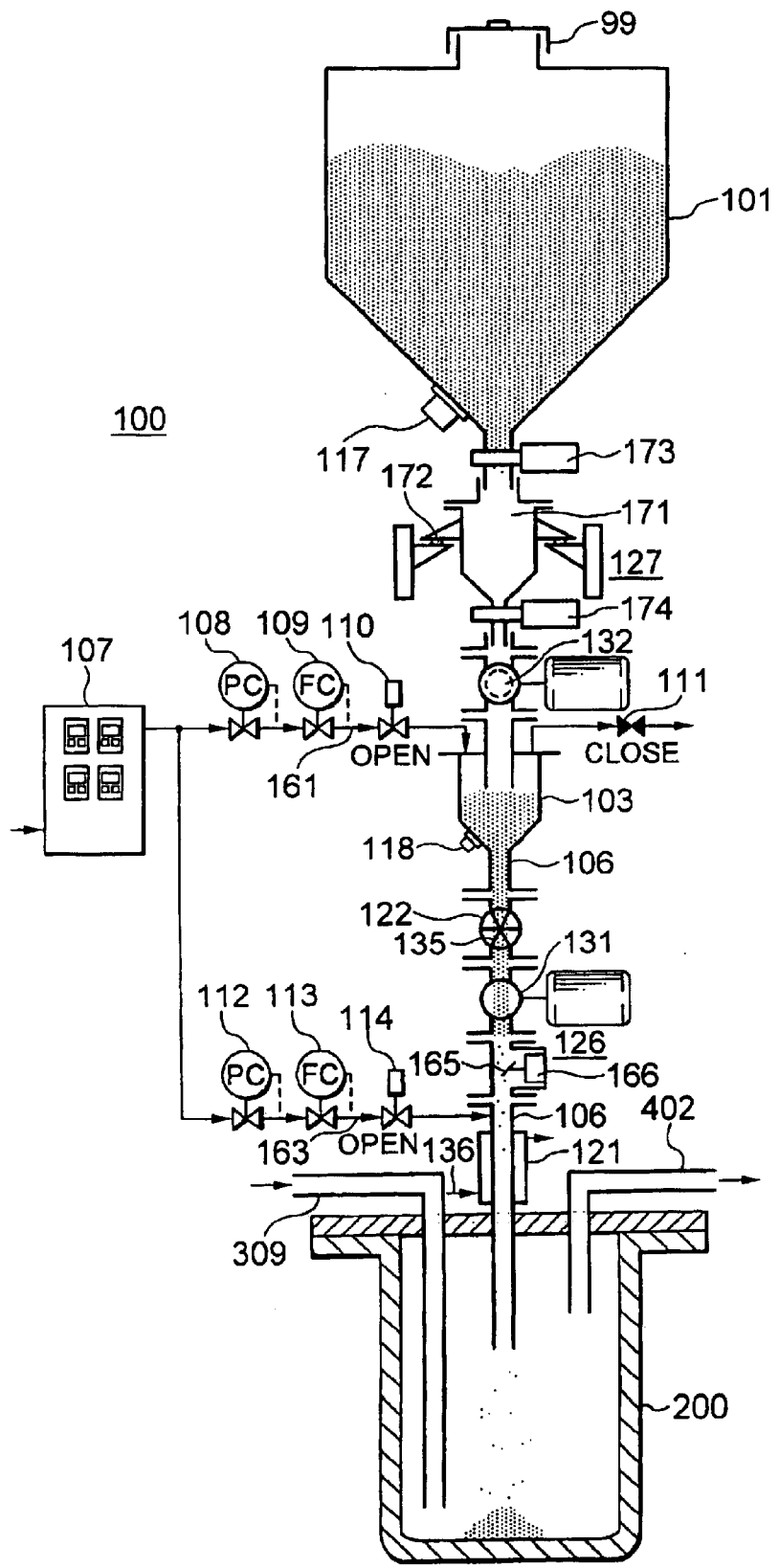
FIG. 10 is a schematic diagram showing a high-pressure treatment apparatus of embodiment 7 of the present invention.

A schematic diagram of an object feeding system 100 of a treatment apparatus involving the present embodiment is shown in FIG. 10.

The treatment apparatus of embodiment 7 has the identical structure with that of embodiment 6 except that the object feeding system 100 comprises another solid feed speed measurement unit 127 between the first solid reservoir 101 and the ball valve 132 and does not comprise a rotary feeder 123.

As shown in FIG. 10, the solid feed speed meter 127 consists of a measuring tank 171 and a weighting level 172. Only the weighting level 172 supports the measuring tank 171. At the outlet of the first solid reservoir 101 an upper switching unit 173 of crushed powder is installed and at the outlet of the measuring tank 171 a lower switching unit 174 of crushed powder is installed.

In implementing measurement actually, first a tare of the measuring tank 171 including the lower switching unit 174 of crushed powder is measured by use of the weighting level 172. With the lower switching unit 174 of crushed power closed and with the upper switching unit 173 of crushed powder opened, the solid waste is fed to the measuring tank 171. With the upper switching unit 173 of crushed powder closed, weight is measured by the weighting level 172. From the measured value the tare weight is subtracted to obtain the net weight of the solid waste. Thus, the net weight of the solid waste fed to the second solid reservoir 103 can be known.

At this time, with an indicated value of the weighting level 172 as a measure to select a point of time to close the upper switching unit 173 of crushed powder, the weight of the solid waste to be fed to the second solid reservoir 103 can be approximately set in the desired range.

By repeating the aforementioned operations with the feed speed measurement unit 127, the accumulated feed amount of the solid waste can be obtained. Therefrom, an average solid feed speed per unit time can be obtained.

With such a constitution, the feed amount of the solid waste to the high-pressure reactor 200 can be controlled. Thereby, the range of fluctuation of the temperature, pressure, composition or the like inside of the high-pressure reactor 200 can be made small to result in further improvement of safety and processing efficiency.

Further, by installing the measuring tank 171 at a place between the first solid reservoir 101 and the ball valve 132 where pressure-resistance function is not required, the measuring tank 171 can be made thinner and lighter. Thereby, accuracy in weighting the solid waste can be maintained high.

Even without providing the rotary feeder, in operating the ball valve 132, by closing the lower switching unit 174 of crushed powder, in the absence of the solid waste the ball valve 132 can be opened and shut. Thereby, the solid waste is made less probable of being nipped in the ball valve 132.
(Embodiment 8)

Figure 11:
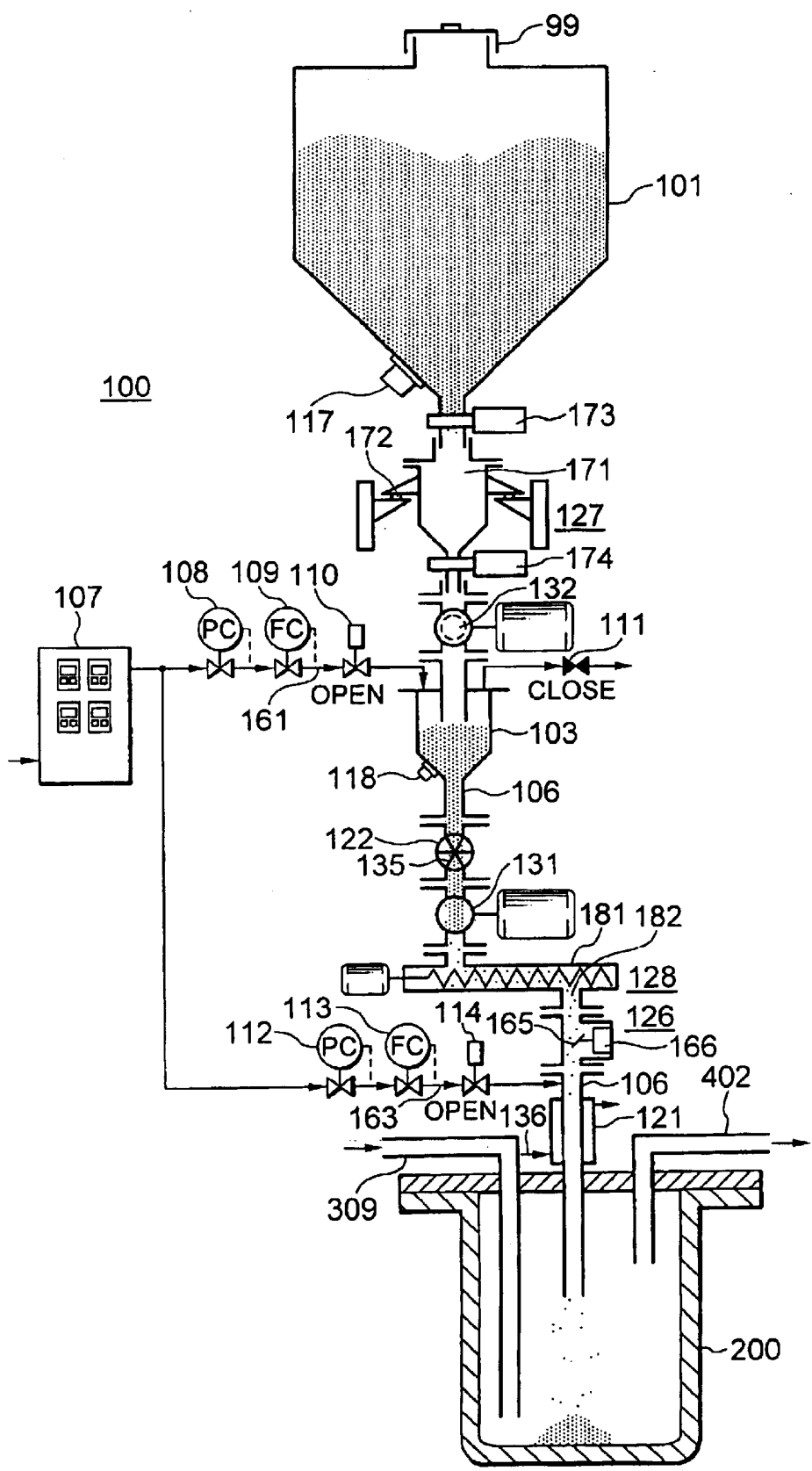
FIG. 11 is a schematic diagram showing a high-pressure treatment apparatus of embodiment 8 of the present invention.

FIG. 11 is a schematic diagram of an object feeding system 100 of a treatment apparatus involving the present embodiment.

A treatment apparatus of embodiment 8 is constituted in the identical structure with that of embodiment 7 except that the object feeding system 100 comprises a screw feeder 128 for feeding the solid to the high-pressure reactor 200.

As shown in FIG. 11, to the second feed pipe 106 between the ball valve 131 and the solid feed speed meter 126, a screw feeder 128 having a screw 181 is installed.

In the case of the rotary feeder 122, the solid waste held in the space surrounded by the rotary vane 135 can be almost simultaneously fed into the high-pressure reactor 200, however, according to the operation of the ball valve 131, can be interrupted. On the other hand, the screw feeder 128 feeds the solid to the high-pressure reactor 200 due to rotation of the screw 181 in turn from the solid reached the feeding outlet 182.

Accordingly, by using the screw feeder 128, compared with the case of embodiment 7 where only rotary feeder 122 is used, the solid waste can be continuously fed without interruption.

Naturally, without installing a rotary feeder 122 but with a screw feeder 128 only, the solid waste can be fed from the second solid reservoir 103 to the high-pressure reactor 200. However, by installing together a rotary feeder 122 as in this embodiment, the solid waste can be effectively prevented from being nipped by the ball valve 131.
(Embodiment 9)

Figure 12:
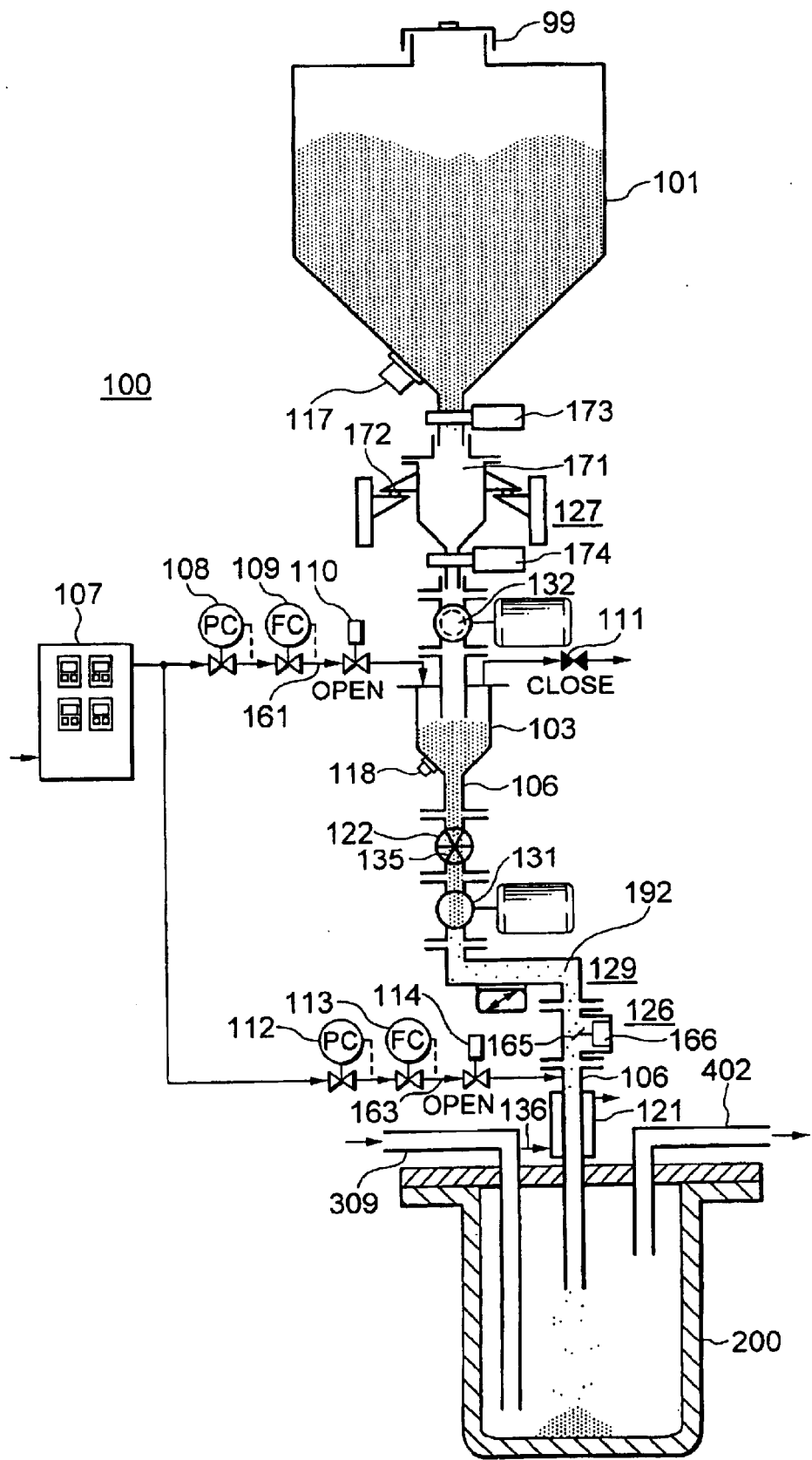
FIG. 12 is a schematic diagram showing a high-pressure treatment apparatus of embodiment 9 of the present invention.

FIG. 12 is a schematic diagram showing an object feeding system 100 of a high-pressure apparatus involving the present embodiment.

A high-pressure treatment apparatus of embodiment 9 has the identical structure with that of embodiment 7 except that the object feeding system 100 comprises a vibration feeder 129 for feeding the solid to the high-pressure reactor 200.

As shown in the figure, to the second feed pipe 106 between the ball valve 131 and the solid feed speed meter 126, a vibration feeder 129 having a vibrator 191 is installed. The vibrator causes to vibrate in an oblique direction.

The vibration feeder 129, as identical with the screw feeder 128, feeds the solid waste to the high-pressure reactor 200 in turn from one reached to the feeding outlet 192. Accordingly, by employing the vibration feeder 129, compared with the case where only rotary feeder 122 is used to feed, the solid waste can be more smoothly and continuously fed.

In addition, the vibration feeder 129, different from the screw feeder 128 disclosed in embodiment 8, has an advantage that there is no necessity of penetrating an axis through a wall surface of structure thereon high-pressure is exerted.

Naturally, without installing a rotary feeder 122 but with a vibration feeder 129 only, the solid waste can be fed from the second solid reservoir 103 to the high-pressure reactor 200. However, by installing together a rotary feeder 122 as in this embodiment, the solid waste can be effectively prevented from being nipped by the ball valve 131.
(Embodiment 10)

Figure 13:
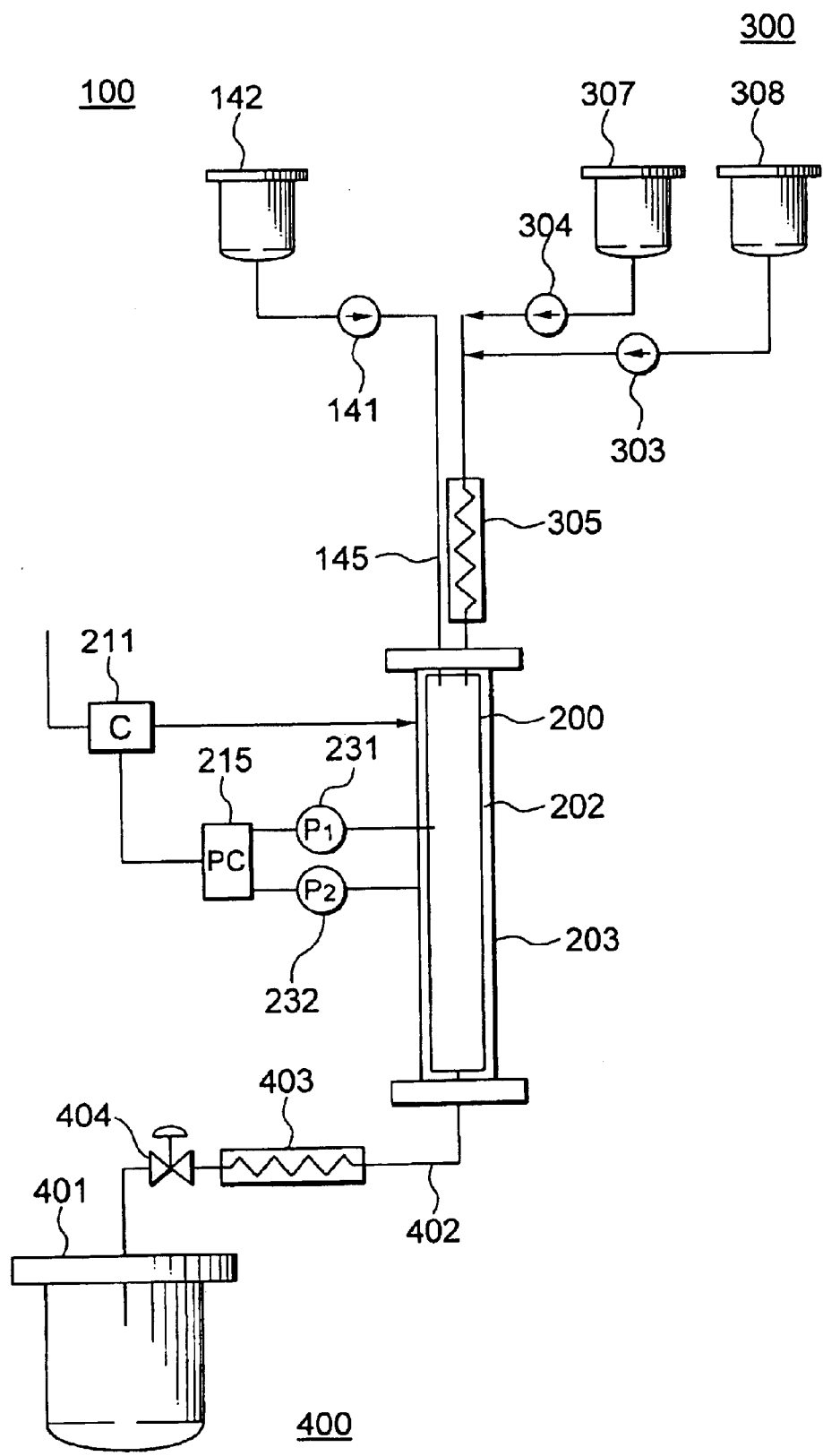
FIG. 13 is a schematic diagram showing a high-pressure treatment apparatus of embodiment 10 of the present invention.

A schematic diagram of a high-pressure treatment apparatus involving the present embodiment is shown in FIG. 13.

The present high-pressure treatment apparatus processes liquid waste as the treatment object, and comprises, as shown in FIG. 13, a high-pressure reactor 200 installed inside of a pressure-resistant exterior vessel 203, an object feeding system 100 for feeding the liquid waste into the high-pressure reactor 200, a medium feeder 300 for feeding reaction medium into the high-pressure reactor 200, and a product recovering unit 400 for recovering reaction products generated within the high-pressure reactor 200.

The high-pressure reactor 200 of the present embodiment has a fundamentally identical constitution with the high-pressure reactor 200 of embodiment 1 except that air, a gas, is used as pressure hold fluid to be filled within the gap 202.

That is, sensors 231 and 232 are installed within the high-pressure reactor 200 and gap 202, and outside of the high-pressure reactor 200, a pressure controller 215 is installed to control the pressure of the air in the gap 202 within the desired range based on the measured values thereof.

The high-pressure reactor 200 is made of stainless steel and an inner surface thereof is coated with Ni alloy. However, the constitution of the high-pressure reactor 200 is not restricted to the above but can be any one that, as cited in embodiment 1, is made of or lined with material that is appropriate to the processing atmosphere. The exterior vessel 203 is made of stainless steel and the thickness thereof is made thick enough to be pressure-resistant.

The ratio of magnitudes of the high-pressure reactor and exterior vessel is approximately 1:1.5. The preferable value of the volume of the high-pressure reactor 200 varies according to the kind of the treatment object, processing amount, processing speed, the kind of the decomposition reaction or the like. In this embodiment, it is approximately 0.01 m$^3$.

The object feeding system 100 comprises an object feed tank 142 for reserving the object, an object feed pipe 145 connected from the object feed tank 142 to the high-pressure reactor 200, and a pump 141. In this embodiment, an existing pump 141 is used but, not particularly restricted, can be any one that can safely and efficiently feed the object to the high-pressure reactor 200.

The reaction medium feeder 300 and products recovering unit 400 are constituted fundamentally identical with that of embodiment 1.

In this embodiment, different from embodiment 1, liquid waste containing polychlorinated biphenyl (PCB) is the treatment object. In this embodiment, waste liquid containing PCB is the object but the waste liquid containing, for instance, trichloroethylene, dioxin or the like can be the object. Slurry in which finely pulverized solid is mixed with water, molten plastics or the like can be the object.

As the reaction medium to be fed to the high-pressure reactor 200, as identical with embodiment 1, water is used. For the oxidant, an aqueous solution of hydrogen peroxide is used to oxidize the waste liquid containing PCB, the object.

In the present embodiment, air fed by the pump 211 is used as the fluid to fill the gap 202 between the high-pressure reactor 200 and exterior vessel 203. However, the fluid is not restricted to this but can be any one that can maintain the pressure of the gap 202 appropriately. For instance, various kinds of inert gases can be used.

In implementing actually, the pressure controller 215, based on the values measured by the pressure sensors 231 and 232, maintains the pressure within the gap 202 higher than that within the high-pressure reactor 200 by 0.5 MPa to 5 MPa. The temperature and pressure within the high-pressure reactor 200 are approximately 500° C. and approximately 30 MPa, respectively.

The liquid waste within the tank 142 is pressurized by use of the pump 141 and is fed into the high-pressure reactor 200 through the waste feeder 145.

Water that is the reaction medium and hydrogen peroxide water that is the oxidant, while being heated by a pre-heater 305, are fed into the high-pressure reactor 200 with the pumps 303 and 304.

Within the high-pressure reactor 200, the liquid waste and the reaction medium react in super-critical state. In the present embodiment, the waste liquid containing organic components such as PCB and others as the treatment object and water is used as the reaction medium. Accordingly, the temperature inside of the high-pressure reactor 200 is maintained in the super-critical state due to the heat of decomposition reaction.

Chloride concentration within the high-pressure reactor 200 is approximately 1000 ppm and the atmosphere thereof is oxidizing. Accordingly, the inner surface of the high-pressure reactor 200, by coating with Ni alloy, can be effectively protected from corrosion.

The decomposition products enter into the waste exhaust pipe 402, after being cooled at the cooling unit 403, go through a pressure hold valve 404 and are exhausted into the decomposition products tank 401.

With such a constitution, when the pressure difference between the high-pressure reactor 200 and exterior vessel 203 is made small, material that is not high in temperature strength but is high in corrosion-resistance can be used as material for high-pressure reactor. By constituting the surface of the high-pressure reactor 200 of corrosion-resistant material according to the kind of the waste, a high-pressure treatment apparatus that is less expensive and excellent in durability can be provided.

Since air is used as the pressure hold fluid, the fluid can be obtained with ease and the apparatus can be constituted simple to result in being less expensive.

The high-pressure treatment apparatus of the present embodiment can be preferably used for not only processing of the industrial waste but also synthesis, extraction or the like of chemical substances. For instance, when carrying out extraction of chemical substance with carbon dioxide as the super-critical medium, the reaction temperature is approximately 31° C. Accordingly, without installing a heater within the high-pressure reactor 200, due to pre-heating of the reaction medium, the reaction can be started and proceeded. When there is no necessity of cooling the reaction products, a reaction products recover unit does not need to be provided with a cooling unit.

Naturally, according to the kind of the object, the reaction medium, and aimed reaction, a heater can be installed within a high-pressure reactor.

The high-pressure reactor of embodiment 10 can be combined with any one of the object feeders 10 of embodiments 1 to 9.

(Embodiment11)

Figure 14:
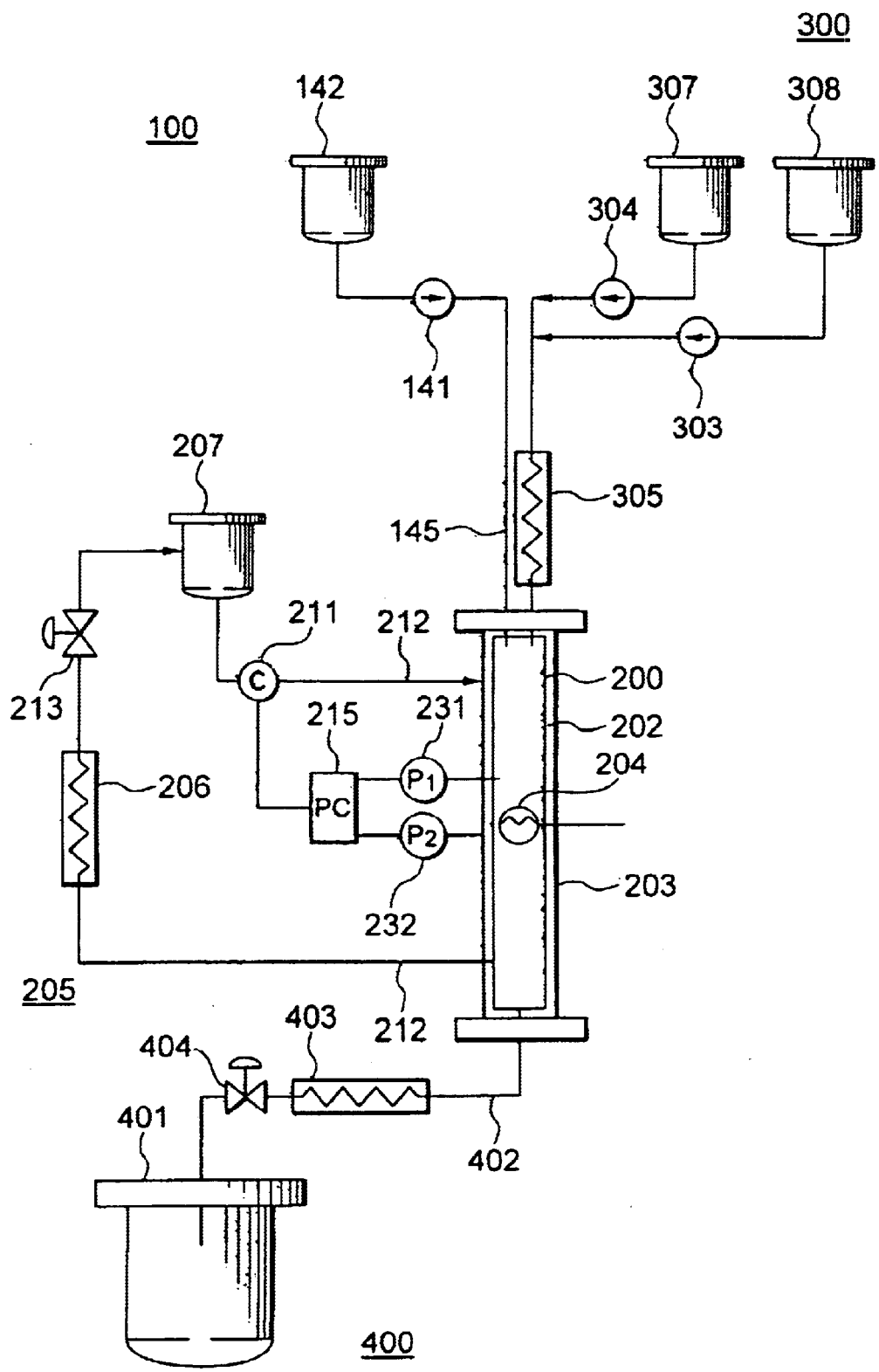
FIG. 14 is a schematic diagram showing a high-pressure treatment apparatus of embodiment 11 of the present invention.

A schematic diagram of a high-pressure treatment apparatus involving the present embodiment is shown in FIG. 14.

The high-pressure treatment apparatus of embodiment 11 has a fundamentally identical constitution with that of embodiment 10 except that the inner surface of the high-pressure reactor 200 is lined with Ni based alloy, a heater 204 is installed inside of the high-pressure reactor 200, water, liquid, is used as the pressure holding fluid to fill the gap 202 between the high-pressure reactor 200 and exterior vessel 203, and a water circulating line 205 having the cooling unit 206 is provided with.

In the present embodiment too, as identical as embodiment 10, the treatment object is liquid waste. In the present embodiment, waste liquid containing PCB is the object however, waste liquid containing trichloroethane, dioxin or the like can be used. Slurry obtained by mixing the pulverized solid with water, molten plastics or the like can be the treatment object.

As shown in the figure, within the high-pressure reactor 200, the heater 204 with a temperature sensor is installed. The surface of the heater 204 is lined with Ti alloy.

To the gap 202, the water circulating line 205 is connected. The water circulating line 205 comprises a water tank 207, a circulation pump 211, a pressure-hold valve 213, a cooling unit 206, piping connecting these, and a pressure controller 215 having pressure sensors 231 and 232 for measuring the pressures of the high-pressure reactor 200 and the gap 202.

Temperature sensors for measuring the temperatures of the high-pressure reactor 200 and the gap 202 and a temperature controller for controlling the temperature of water (pressure-holding fluid) based on the values measured by the temperature sensors can be installed.

In the water circulating line 205, water within the tank 207 is pressurized by the pump 211 to feed into the gap 202 through the duct 212. The pressure within the high-pressure reactor 200 and gap 202 are measured with the pressure sensors 231 and 232 and based on the measured values the pressure controller 215 controls the state of operation of the pump 211. Thereby, the pressure of the water within the gap 202 is held higher than that inside of the high-pressure reactor 200 by approximately 0.5 MPa to 5 MPa.

The water fed into the gap 202 is circulated through the duct 212 while being cooled by the cooling unit 206 of the water circulating line 205. Thereby, the temperature of the exterior vessel 203 can be held lower than that of the high-pressure reactor 200. For instance, in the case of the present embodiment, the exterior vessel 203 is preferable to be cooled for the temperature thereof to be approximately 100° C. to 200° C.

When the solid waste, after forming in the form of slurry, is pressurized by the pump 141 and fed into the high-pressure reactor 200, water from the tank 207 can be used to form the slurry.

The temperature within the high-pressure reactor is approximately 500° C. and the pressure is approximately 30 MPa. The temperature is maintained by use of a heater 204 with a temperature sensor.

Within the high-pressure reactor 200, in the super-critical state the liquid waste reacts with the reaction medium. In this embodiment, the heater 204 is installed to keep the reaction medium in the super-critical state. However, when the reaction is proceeded without heating, there is no need to install the heater. According to the reaction, the heater can be used only for start-up heating and heat source during operation can rely on the reaction products. In such a case, it is preferable to be constituted so that a cooling gas can be circulated within the heater. By cooling during shut-off of the heater, the surface of the heater can be prevented from being corroded due to overheating.

In the present apparatus, water is used as the pressure-holding fluid and is circulated by installing the water circulating line 205 having a cooling unit. Thereby, the temperature of the exterior vessel 203 can be held lower than that of the high-pressure reactor 200. Accordingly, even when the processing temperature of the liquid waste is high, the temperature of the gap 202 can be lowered to prevent the exterior vessel 203 from being corroded. Even materials of low high-temperature strength can be used as materials for the exterior vessel 203. Thereby, the range of selection of material for the exterior vessel 203 can be broadened to result in reduction of cost.

In addition, the temperature of the inner wall of the high-pressure reactor 200 can be held lower than that of the inside of the reactor. Thereby, precipitation of the surface of the high-pressure reactor 200 can be prevented from occurring to alleviate corroding conditions. That is, under the super-critical condition, the solubility of metal oxides is extremely low. Accordingly, in processing the plastic waste under the super-critical condition, metals in the waste form halides to precipitate on the inner wall of the high-pressure reactor 200 to tend to cause corrosion of the vessel. When the temperature of the inner wall of the high-pressure reactor 200 is lowered, the super-critical condition is alleviated and the solubility of the metal oxides is raised, resulting in prevention of occurrence of precipitation of the oxides.

When the heater 204 is installed inside of the high-pressure reactor 200, compared with the case of installing outside thereof, by reducing a surface area of the heater 204, the cost of the heater can be made lower.

Further, the surface of the heater 204 can be constituted of appropriate corrosion-resistant material according to the kind of the treatment object. Thereby, the heater 204 can be protected from corrosion to result in a high-pressure treatment apparatus that is less expensive and excellent in durability.

The high-pressure reactor of embodiment 11 can be used together with any object feeder of embodiments 1 to 9. In particular, it is preferable when the processing temperature of the solid waste, the object, is high.

(Embodiment 12)

Figure 15:
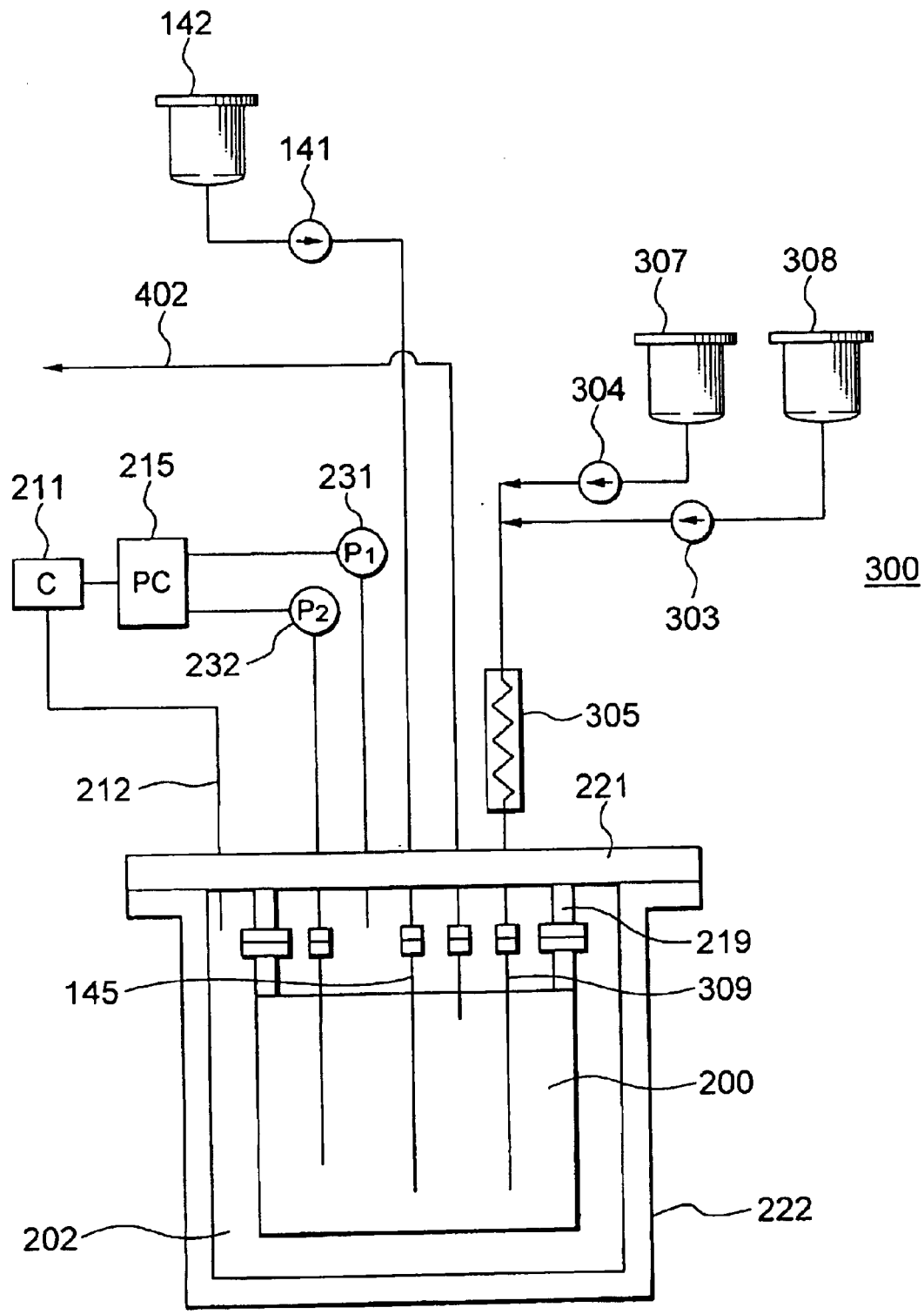
FIG. 15 is a schematic diagram showing a high-pressure treatment apparatus of embodiment 12 of the present invention.

FIG. 15 is a schematic diagram showing a high-pressure reactor of a high-pressure treatment apparatus involving the present embodiment.

The high-pressure treatment apparatus of embodiment 12 is constituted fundamentally identical with that of embodiment 10 except that the exterior vessel 203 of the high-pressure reactor 200 consists of a cover 221 and a trunk portion 222, and the high-pressure reactor 200 is fixed removable to the cover 221.

As shown in FIG. 15, the exterior vessel of the high-pressure reactor 200 comprises the cover 221 that can be opened and shut and a sliding trunk 222.

To the cover 221 a coupling support 219 is welded to fix removable the high-pressure reactor 200. Further, an object feeding pipe 145, a reaction medium feeding pipe 309, a products exhaust pipe 402, piping 212, and pressure sensors 231 and 232 are also connected thereto.

To the high-pressure reactor 200, the coupling support 219, the waste feeding or object feeding pipe 145, the reaction medium feed pipe 309, the products exhaust pipe 402 and a pressure sensor 231 are fixed removable.

In the present embodiment, when the high-pressure reactor 200 suffers damage such as corrosion or the like, the trunk portion 222 of the exterior vessel can be separated from the cover 221 and slid to expose the high-pressure reactor 200. Thereby, the coupling support 219, the object feeding pipe 145, the reaction medium feed pipe 309, products exhaust pipe 402 and the pressure sensor 232 can be removed from the high-pressure reactor 200. Accordingly, the damaged high-pressure reactor 200 can be repaired and exchanged with ease. As a result of this, in addition to the effects of embodiment 10, maintenance cost of the apparatus can be remarkably reduced.

The high-pressure reactor 200 can be fixed removably to the trunk portion 222. In short, the high-pressure reactor 200 need only be constituted to be removable from other structure such as the exterior vessel 203. The coupling support 219, object feed pipe 145, reaction medium feed pipe 309, products exhaust pipe 402, piping 212 and pressure sensors 231 and 232 can be fixed removable from the exterior vessel 203.

As in embodiment 11, liquid such as water may be used as the pressure-holding fluid and a water circulating line having a cooling unit may be installed to maintain the temperature of the exterior vessel lower than that of the high-pressure reactor.

Further, the high-pressure reactor of the present embodiment 12 can be used in combination with any one of the object feeder of embodiments 1 to 9.

As mentioned above, according to the high-pressure treatment apparatus of the present invention, the solid, without rendering in slurry or melting, can be intermittently or continuously fed into the high-pressure reactor. Accordingly, conditions such as the temperature, pressure, composition or the like within the high-pressure reactor can be made small in the range of fluctuation. In addition, the fluid within the high-pressure reactor can be prevented from back flow towards the object feeder. Further, a high-pressure treatment apparatus having a high-pressure reactor excellent in safety and corrosion-resistance and a protective method thereof can be provided.

Accordingly, a high-pressure treatment apparatus excellent in processing efficiency and safety can be provided less expensive.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

What is claimed is:

1. A pressure treatment apparatus for processing a solid waste, comprising:
   an exterior vessel;
   a pressure reactor installed inside the exterior vessel with a gap therebetween;
   means for feeding a solid waste by using gravity into the pressure reactor, the means for feeding the solid waste comprising:
      primary crushing means for crushing the solid waste,
      a first solid reservoir for receiving primary crushed solid waste and
      a second solid reservoir which is connected to the first solid reservoir through a first connecting pipe and connected to the pressure reactor through a second connecting pipe,
      wherein the first connecting pipe provides a first sealing unit and the second connecting pipe provides a second sealing unit, wherein at least the first sealing unit, the first connecting pipe, which is downstream from the first sealing unit, the second solid reservoir, the second connecting pipe, the second sealing unit, and the pressure reactor have a pressure resistant structure;
   a pressure fluid feeder for feeding a first pressure fluid into the second solid reservoir and a second pressure fluid into the second connecting pipe between the second sealing unit and the pressure reactor;
   means for feeding a reaction medium into the pressure reactor;
   means for feeding a third pressure fluid into the gap; and
   means for controlling pressure of the first, second, and third pressure fluids and a pressure within the pressure reactor such that the pressure of the first pressure fluid is higher than the pressure of the second pressure fluid, the pressure of the second pressure fluid is higher than the pressure within the pressure reactor and the pressure of the third pressure fluid is higher than the pressure within the pressure reactor, wherein the exterior vessel is isolated from the solid waste and the reaction medium.

2. The pressure treatment apparatus as set forth in claim 1, further comprising means for controlling temperature of the exterior vessel to be lower than that of the pressure reactor.

3. The pressure treatment apparatus as set forth in claim 1, wherein the exterior vessel comprises a trunk portion and a cover portion that opens and shuts, the pressure reactor being fixed to be removable to the exterior vessel.

4. The pressure treatment apparatus as set forth in claim 1, wherein the pressure reactor is formed of at least one material selected from a group consisting of austenite stainless steel, Ni, Zr, Ti, Ta, Au, Pt, and alloys thereof.

5. The pressure treatment apparatus as set forth in claim 1, wherein an inner surface of the pressure reactor is lined with at least one material selected from a group consisting of austenite stainless steel, Ni, Zr, Ti, Ta, Au, Pt, and alloys thereof.

6. The pressure treatment apparatus as set forth in claim 1, wherein an inner surface of the pressure reactor is coated by ceramic material by thermally spraying.

7. The pressure treatment apparatus as set forth in claim 1, wherein the third pressure fluid is pressurized water.

8. The pressure treatment apparatus as set forth in claim 1, wherein the first sealing unit comprises a first reciprocating switchgear and the second sealing unit comprises a second reciprocating switchgear.

9. The pressure treatment apparatus as set forth in claim 1, wherein the means for feeding a reaction medium comprises means for feeding a super-critical water into the pressure reactor.

10. The pressure treatment apparatus as set forth in claim 9, wherein the means for feeding a super-critical water comprises a pump and a pre-heater.

11. The pressure treatment apparatus as set forth in claim 9, wherein the means for feeding a reaction medium further comprises means for feeding hydrogen peroxide into the pressure reactor.

* * * * *